(12) United States Patent
Chakraborty

(10) Patent No.: US 9,136,899 B2
(45) Date of Patent: Sep. 15, 2015

(54) BUILT IN SELF TEST AND METHOD FOR RF TRANSCEIVER SYSTEMS

(71) Applicant: Texas Instruments Incorporated, Dallas, TX (US)

(72) Inventor: Sudipto Chakraborty, Richardson, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 139 days.

(21) Appl. No.: 13/908,203

(22) Filed: Jun. 3, 2013

(65) Prior Publication Data

US 2014/0355655 A1  Dec. 4, 2014

(51) Int. Cl.
| | |
|---|---|
| H03C 1/62 | (2006.01) |
| H04B 17/00 | (2015.01) |
| H04B 1/40 | (2015.01) |
| H04W 52/02 | (2009.01) |

(52) U.S. Cl.
CPC .................. *H04B 1/40* (2013.01); *H04B 17/00* (2013.01); *H04W 52/0261* (2013.01)

(58) Field of Classification Search
USPC .......... 455/115.1, 115.2, 115.3, 226.1, 226.2, 455/67.11, 67.14, 574, 127.5, 343.1
See application file for complete search history.

(56) References Cited

U.S. PATENT DOCUMENTS

| | | | |
|---|---|---|---|
| 8,306,157 B2* | 11/2012 | Seendripu et al. | 375/332 |
| 2003/0176174 A1* | 9/2003 | Seppinen et al. | 455/226.1 |
| 2006/0281411 A1* | 12/2006 | Isaac et al. | 455/63.1 |
| 2006/0281432 A1* | 12/2006 | Isaac et al. | 455/323 |

* cited by examiner

*Primary Examiner* — Nguyen Vo
(74) *Attorney, Agent, or Firm* — John R. Pessetto; Charles A. Brill; Frank D. Cimino

(57) ABSTRACT

Integrated circuit transceiver circuitry (2) includes a first resonant circuit (3A) coupled to a narrowband interface (6,7A,7B,21) between a first amplifier (3,20) and an interfacing circuit (4,8,9,44), including a programmable first reactive element (C) and a second reactive element (L). Amplitude sensing circuitry (42) senses a maximum amplitude of an in-phase signal (I) or a quadrature-phase signal (Q). An on-chip first tone generation circuit (38,38A,38B,38C) generates tones for injection into the in-phase signal and the quadrature-phase signal and operates in response to frequency scanning circuitry (30) and the amplitude sensing circuitry to adjust the first reactive element (C) to calibrate the first resonant circuit to a desired resonant frequency by selectively coupling reactive sub-elements (1,2,4,8 . . . xCv) into the first reactive element (C).

10 Claims, 11 Drawing Sheets

BUILT IN SELF TEST AND METHOD FOR RF TRANSCEIVER SYSTEMS

BACKGROUND OF THE INVENTION

The present invention relates generally to RF (radio frequency) transceivers including circuitry for providing both reduced power consumption and increased dynamic range and accuracy, and more particularly to on-chip self test circuitry and methodology for reducing power consumption by automatically correcting for resonance frequency errors caused by integrated circuit process variation and the Q factor error caused by chip temperature variation.

FIG. 1 illustrates an RF transceiver 1 including a typical low-power RF front end circuit 2 coupled by an impedance matching network 4 to an antenna 5. A modem 14 is coupled to a quadrature-phase signal channel Q of RF front end circuit 2 by means of a delta sigma ADC (analog to digital converter) 24Q and is coupled, in a in-phase signal channel 1 of RF front end circuit 2 by means of another delta sigma ADC 24I. A power management circuit 22 provides accurate DC voltages and DC currents required in RF front end circuit 2.

RF front end transceiver circuit 2 includes LNA (low noise amplifier) 3 having its input coupled by conductor 6 to impedance matching network 4 and a first output coupled by a conductor 7A to a first input of each of mixers 8 and 9. A second output of LNA 3 is connected by conductor 7B to a second input of each of mixers 8 and 9. A third input of each of mixers 8 and 9 is connected by a 2-conductor bus 17I (because the in-phase signal I conducted thereby is a differential signal) to receive the in-phase "I" signal generated by a frequency synthesizer 16, and a fourth input of each of mixers 8 and 9 is connected by a 2-conductor bus 17Q to receive a quadrature-phase "Q" signal generated by frequency synthesizer 16. The I and Q channels are phase shifted by 90 degrees from each other. Both mixers 8 and 9 receive differential signals from LNA 3 and operate on one of the local oscillator (LO) phases. For example, mixer 8 can operate with the I phase while mixer 9 operates from the Q phase. In a direct up-conversion transmitter part of a transceiver, information contained within a limited bandwidth of the I and Q phases is multiplied by a signal generation network and summed to create a single sideband. In the receiver part of the transceiver, the received signal is down-converted with respect to the signal generation network.

The differential output produced by mixer 8 is provided as an input to a low pass filter 10I, the output of which is coupled to the differential input of sigma delta ADC (analog to digital converter) 24I, and the differential output produced by mixer 9 is provided as an input to a low pass filter 10Q, the output of which is coupled to the differential input of sigma delta ADC 24Q. An output of modem 14 is connected by a digital bus 15 to an input of frequency synthesizer 16. An analog output of frequency synthesizer 16 is connected by conductor 18 to an input of an adjustable gain pre-power amplifier (PPA) or power amplifier (PA) driver 20A, the output of which is connected to the input of a convention power amplifier (PA). The output of power amplifier 20B is connected by conductor 21 to impedance matching network 4.

Modern transceivers usually provide the above mentioned "in-phase" RF signal I and an RF "quadrature-phase" signal Q which is 90 degrees out of phase relative to the in-phase I signal. At resonance, the phase shift caused by the high impedance of a resonating tank circuit structure is zero, and due to the down-conversion of the orthogonal phase I and Q signals, one of them provides a maximum output amplitude while the other provides a minimum or null amplitude. RF transceiver "front end" circuitry generally is narrow-band in nature and depends heavily on the performance of integrated resonator circuits (also referred to as "tank circuits" or "resonators").

RF transceiver systems require narrow band circuits which include resonating LC tank circuits or resonators. While the inductance of a tank circuit is greatly dependent on the geometry of the inductors therein, the tank circuit capacitance varies greatly over temperature and process "corners" (i.e., maximum and minimum values of temperature and process parameters) for modern integrated circuit silicon technologies. (Integrated circuit manufacturing foundries generally utilize processes with worst-case variations that are within 3-sigma levels.)

The resonance frequency of an L/C tank circuit is given by $fc=1/\text{sqrt}(LC)$, where "sqrt (LC)" means "square root of LC". With integrated circuit process variations, the value of the inductance L remains approximately constant as it is dependent on the inductor geometry, while the capacitance C exhibits a significant amount of process-dependent variation. Usually, to create minimum distortion in the signal processing at RF frequencies, linear capacitors are used which provide low voltage coefficients, and these linear capacitors exhibit large process variation. Therefore, the center frequency errors are caused more by the capacitance variation. On the other hand, the quality factor Q of an inductor of inductance L is defined by the ratio of its inductive impedance to its resistive impedance, and is given by $Q=(2\times\pi\times fc\times L)/r$, where fc is the resonance frequency and r is the series resistance of the inductor. The series resistance "r" is the resistance of a metal resistor, and varies significantly over temperature. The impedance of a parallel resonating tank circuit is given as $Z=2\times\pi\times fc\times L\times Q$. For example, with a typical 0.39% per degree C temperature coefficient for copper metallization, the variation of metal resistance over a range of 125 degrees (typical industrial operating range is ~40° C. to 85° C.) would be 48.75% (125× 0.0039). Therefore, when the frequency errors are calibrated out, the temperature dependent effects can lead to as much as a 50% variation in signal amplitude.

Thus, although the inductors of the tank circuits provide significant advantages to improving dynamic range per unit current consumption, some calibration/compensation is needed to optimize its performance. At the present state-of-the-art, most on-chip resonant tank frequency centering is performed utilizing production testing that requires a substantial amount of equipment cost and test time. The subsequently described invention provides built-in self-calibration to address both problems.

LC impedance matching networks are usually configured to provide a series resonance and are designed to provide an optimum impedance conversion between the antenna and the integrated circuit chip, and are dependent on the values of inductance and capacitance of the LC impedance matching network, and there respective unloaded quality factors Q. Although large inductors required for low frequency operation must be located "off-chip" because of their large physical size and their relatively large amount of resistance, small inductors for high-frequency applications are commonly included "on-chip".

Prior attempts to reduce variations in the resonant frequency of integrated circuit transceiver tank circuits usually have reduced the quality factor Q of the tank circuits. (The quality factor Q is a tank circuit parameter which represents the ratio between the amount of the energy stored in the tank circuit and the amount of energy dissipated in it. A decrease in the Q factor of a tank circuit increases its current consumption and therefore degrades filtering at RF frequencies. Further-more, these problems become more severe in transceivers that have wide operating bandwidths.) Increasing the Q factor of a tank circuit results in more effective tuning and reduces current consumption of RF circuits with almost zero DC voltage drop, which in turn results in improved RF signal receiving and transmitting capability in a transceiver. Increasing the Q factor also improves the dynamic range of a transceiver, resulting in improved signal-to-noise ratios of various transceiver components and generally improving the maximum signal-representing capability and minimum signal-representing capability of system in which the transceiver is included.

Degradation of signal filtering in a transceiver at RF frequencies may be caused by reduction of the Q factor of on-chip tank circuits which occurs as a result of variation in chip manufacturing processes and variation in chip temperature. For example, if the receiver portion of a transceiver is designed to operate at 2.4 GHz, but the integrated circuit manufacturing process variation results in the resonance frequency of a tank circuit actually being centered at 2.6 GHz, it may be necessary to somehow shift the tank circuit resonance frequency down from 2.6 GHz to the required 2.4 GHz. It should be appreciated that a receiver signal reduction of as little as 5 or 6 dB can be very undesirable or even catastrophic, especially for low-power designs in which a few hundred microamperes of current is very significant.

Unfortunately, there has been no practical way of achieving the above-mentioned shift of a tank circuit resonance frequency needed to correct an erroneous value of the resonance frequency caused by the integrated circuit manufacturing process variation and the chip temperature variation.

Transceivers typically include mixers, which can be represented as analog multipliers. A mixer can be configured as either a frequency down-converter or a frequency up-converter. A mixer configured as a down-converter operates to convert a received high frequency RF signal to a low frequency signal without loss of any information. This may allow information contained in the received RF signal to be down-converted and digitally processed at a much lower frequency. Similarly, a mixer configured as an up-converter operates to convert a low frequency signal to a corresponding high frequency signal without loss of any information, for example to up-convert information generated of relatively low signal frequency to a much higher frequency so it may be transmitted as an RF signal.

Thus, there is an unmet need for a circuit and method which avoid increase in power consumption and reduction of dynamic range of a transceiver due to variation in the resonant frequency of conventional integrated circuit resonators or tank circuits.

There also is an unmet need for a circuit and method which avoid increase in power consumption and reduction of dynamic range of a transceiver due to variation in the resonant frequency of conventional integrated circuit resonators or tank circuits caused by variations in the quality factor Q of the resonators or tank circuits due to variation in integrated circuit process parameters and/or chip temperature.

There also is an unmet need for a low-cost calibration circuit and method which improve dynamic range per unit current consumption in low power transceivers.

There also is an unmet need for a circuit and method which avoid problems due to drift in the resonance frequency of on-chip tank circuits.

There also is an unmet need for a way of providing built-in-self calibration of on-chip tank circuits that requires very little integrated circuit chip area.

There is also an unmet need of a way of providing in-situ calibration of an on-chip tank circuit wherein the tank circuit itself, rather than a replica thereof, is tested, with minimum loading on the main tank circuit signal.

SUMMARY OF THE INVENTION

It is an object of the invention to provide a circuit and method which avoid increase in power consumption and reduction of dynamic range of a transceiver due to variation in the resonant frequency of conventional integrated circuit resonators or tank circuits.

It is another object of the invention to provide a circuit and method which avoid increase in power consumption and reduction of dynamic range of a transceiver due to variation in the resonant frequency of conventional integrated circuit resonators or tank circuits caused by variations in the quality factor Q of the resonators or tank circuits due to variation in integrated circuit process parameters and/or chip temperature.

It is another object of the invention to provide a circuit and method which improve dynamic range per unit current consumption in low power transceivers.

It is another object of the invention to provide a circuit and method which avoid problems due to drift in the resonance frequency of on-chip tank circuits.

It is another object of the invention to provide a circuit end method in which self-calibration of on-chip tank circuitry may be performed anytime during the life time of a product containing the on-chip tank circuitry.

It is another object of the invention to provide a circuit and method in which that front-end amplifiers and mixers may be calibrated so as to reduce intermodulation distortion.

It is another object of the invention to provide a circuit and method wherein multiple on-chip resonant circuits may be calibrated to desired corresponding center frequencies and bandwidths utilizing minimal on-chip calibration circuitry.

It is another object of the invention to provide a circuit and method wherein on-chip calibration circuitry can calibrate on-chip resonant circuitry in modern transceivers with flexible IF so as to avoid down-conversion at DC due to general circuit impairment at near-DC frequency.

Briefly described, and in accordance with one embodiment, the present invention provides integrated circuit transceiver circuitry (2) including a first resonant circuit (3A) coupled to a narrowband interface (6,7A,7B,21) between a first amplifier (3,20) and an interfacing circuit (4,8,9,44), including a programmable first reactive element (C) and a second reactive element (L). Amplitude sensing circuitry (42) senses simultaneously a maximum amplitude of an in-phase signal (I) and a minimum amplitude of a quadrature-phase signal (Q) or vice-versa. An on-chip first tone generation circuit (38,38A,38B,38C) generates tones for injection into the in-phase signal and the quadrature-phase signal and operates in response to frequency scanning circuitry (30) and the amplitude sensing circuitry to adjust the first reactive element (C) to calibrate the first resonant circuit to a desired resonant frequency by selectively coupling reactive sub-elements (1,2, 4,8 . . . xCv) into the first reactive element (C).

In one embodiment, the invention provides transceiver circuitry (2) on an integrated circuit chip (101) having reduced power consumption and high dynamic range, including a first resonant circuit (3A) coupled to a narrowband interface (6,7A,7B,21) between a first amplifier (3,20) and an interfacing circuit (4,8,9,44), the first resonant circuit (3A) including a programmable first reactive element (C) and a second reactive element (L) which together determine a resonant frequency of the first resonant circuit (3A); wherein the transceiver circuitry (2) includes an in-phase signal channel (I) and a quadrature-phase signal channel (Q) and amplitude sensing circuitry (42) for sensing a maximum amplitude of an in-phase signal (I) and a generation circuit (38,38A,38B,38C) generating tones for injection into the in-phase signal channel (I) and the quadrature-phase signal channel (Q) and operative in response to frequency scanning circuitry (30) and also operative in response to the amplitude sensing circuitry (42) to adjust the programmable first reactive element (C) to calibrate the resonant frequency of the first resonant circuit (3A) from an undesired value to a desired resonant frequency (fc) by selectively coupling reactive sub-elements (1,2,4,8 . . . ×Cv) into operative relationship with the programmable first reactive element (C).

In one embodiment the narrowband interface (6,7A,7B,21) is one of the group including an interface (6) between an impedance matching resonant network (4) and a low noise amplifier (3), an interface (21) between the matching resonant network (4) and a power amplifier (20), an interface (7A,7B) between the low noise amplifier (3) and mixer circuitry (8,9,44), and an interface (7A,7B) between the power amplifier (20) and the mixer circuitry (8,9,44). The second reactive element includes an inductor ($L_p$) and the reactive sub-elements are an array of capacitors (1,2,4,8 . . . ×Cv) selectively coupled to harm the programmable first reactive element (C). In one embodiment, the capacitors (1,2,4,8 . . . ×Cv) of the array (C) are binary weighted.

In one embodiment, the capacitive array (C) includes a first group of switches (M6-0,1,2,3) for selectively coupling capacitors (1,2,48 . . . ×Cv) of the array (C), respectively, between first (7A) and second (7B) terminals of the first resonant circuit (3A) in response to control circuitry (25,27, 30,33) and the amplitude sensing circuitry (42).

In one embodiment, the first amplifier (3) is a low noise amplifier (3) including input circuitry which includes a programmable first input transistor array (M1A) including a first group of parallel-connected binary weighted transistors (M1-0,1,2,3) having control electrodes coupled, respectively, to the control circuitry (25,27,30,33) for adjusting the conductance of the programmable first transistor array (M1A) to improve matching between a second resonant circuit (4) coupled between a control electrode of the programmable first transistor array (M1A) and an RF signal source (5), and wherein the input circuitry (M1A,M1B) also includes a programmable second input transistor array (M1B) including a second group of parallel-connected binary weighted transistors (M1-0,1,2,3) having control electrodes, respectively, coupled to the control circuitry (25,27,30,33) for adjusting the conductance of the programmable second transistor array (M1B) to match the conductance of the programmable first input transistor array (M1A).

In one embodiment, the control circuitry (25,27,30,33) and the amplitude sensing circuitry (42) cooperate to search for a binary input transistor selection code which causes selection of various switches (M6-0,1,2,3) of the first group so as to calibrate the resonant frequency of a second resonant circuit (4) to equal the desired resonant frequency (fc).

In one embodiment, the transceiver includes mixer circuitry (8,9,44) for generating the in-phase signal (I) and the quadrature-phase signal (Q), the first tone generation circuit (38A) including double chopping circuitry (43) including first chopping circuitry (M3A,M3B) chopping a calibration current ($I_{CAL}$) in response to a first chopping signal $\cos(\omega_{LO}t)$ and also including second chopping circuitry (M4,A,B,C,D) chopping outputs (12A,12B) of the first chopping circuitry (M3A,M3B) in response to a second chopping signal $\cos(\omega_{BB}t)$, wherein outputs of the second chopping circuitry (M4,A,B,C,D) are injected into an interface (7A,7B) between a low noise amplifier (3) and the mixer circuitry (8,9). In one embodiment, the double chopping circuitry (43) includes a current source transistor ($M_{CAL}$) coupled between a first reference voltage (GND) and sources (13) of first (M3A) and second (M3B) chopper transistors, the double chopping circuitry (43) also including a third chopper transistor (M4A) having a source coupled to a drain of the first chopper transistor (M3A) and a drain coupled to the first terminal (7A) of the first resonant circuit (3A), a fourth chopper transistor (M4B) having a source coupled to the drain of the first chopper transistor (M3A) and a drain coupled to the second terminal (7B) of the first resonant circuit (3A), a fifth chopper transistor (M4C) having a source coupled to a drain of the second chopper transistor (M3B) and a drain coupled to the first terminal (7A) of the first resonant circuit (3A), and a sixth chopper transistor (M4D) having a source coupled to the drain of the second chopper transistor (M3B) and a drain coupled to the second terminal (7B) of the first resonant circuit (3A), a first chopping signal $\cos(\omega_{LO}t)$ being coupled to an input of the mixer circuit (44) and a gate of the second chopper transistor (M3B), a second chopping signal $-\cos(\omega_{LO}t)$ being coupled to another input of the mixer circuit (44) and a gate of the second chopper transistor (M3B), a third chopping signal $\cos(\omega_{BB}t)$ being coupled to gates of the third (M4A) and sixth (M4D) chopper transistors, and a fourth chopping signal $-\cos(\omega_{BB}t)$ being coupled to gates of the fourth (M4B) and fifth (M4C) chopper transistors, where $\omega_{LO}$ is the angular frequency of the first chopping signal $\cos(\omega_{LO}t)$ and $\omega_{BB}$ is the angular frequency of the third chopping signal $\cos(\omega_{BB}t)$.

One embodiment, the transceiver circuitry includes mixer circuitry (8,9,44) for generating the in-phase signal (I) and the quadrature-phase signal (Q), the first tone generation circuit (38B) including first double chopping circuitry (43) including first chopping circuitry (M3A,M3B) chopping a first calibration current ($I_{CAL}$) in response to a first chopping signal $\cos(\omega_{LO}t)$ and also including second chopping circuitry (M4, A,B,C,D) chopping outputs of the first chopping circuitry (M3A,M3B) in response to a second dropping signal $\cos(\omega_{BB}t)$ wherein outputs of the second chopping circuitry (M4, A,B,C,D) are injected into an interface (7A,7B) between a low noise amplifier (3) and the mixer circuitry (8,9,44) the first tone generation circuit (38B) also including second double chopping circuitry (43A) including first chopping circuitry (M1A,M1B) chopping a second calibration current ($I_{CAL}$) in response to a first chopping signal $\cos(\omega_{LO}t)$ and also including second chopping circuitry (M2A,B,C,D) chopping outputs of the first chopping circuitry (M1A,M1B) in response to a second chopping signal $\cos(\omega_{BB}t)$, wherein outputs of the second chopping circuitry (M2A,B,C,D) are injected into the interface (7A,7B) between the low noise amplifier (3) and the mixer circuitry (8,9,44) where $\omega_{BB}$ is a baseband angular frequency and $\omega_{LO}$ is a local oscillator angular frequency. In one embodiment, the first double chopping circuitry (43) includes a first current source transistor ($M_{CAL}$) coupled between a first reference voltage (GND) and sources (13) of first (M3A) and second (M3B) chopper transistors, the first double chopping circuitry (43) also including a third chopper transistor (M4A) having a source coupled to a drain of the first chopper transistor (M3A) and a drain coupled to the first terminal (7A) of the first resonant circuit (3A), a fourth chopper transistor (M4B) having a source coupled to the drain of the first chopper transistor (M3A) and a drain coupled to the second terminal (7B) of the first resonant circuit (3A), a fifth chopper transistor (M4C) having a source coupled to a drain of the second chopper transistor (M3B) and a drain coupled to the first terminal (7A) of the first resonant circuit (3A), and a sixth chopper transistor (M4D) having a source coupled to the drain of the second chopper transistor (M3B) and a drain coupled to the second terminal (7B) of the first resonant circuit (3A), the first chopping signal $\cos(\omega_{LO}t)$ being coupled to an input of the mixer circuit (44) and a gate of the second chopper transistor (M3B), a third chopping signal $-\cos(\omega_{LO}t)$ being coupled to another input of the mixer circuit (44) a gate of the first chopper transistor (M3A), a fourth chopping signal $\cos(\omega_{BB2}t)$ being coupled to gates of the third (M4A) and sixth (M4D) chopper transistors, and a fifth chopping signal $-\cos(\omega_{BB2}t)$ being coupled to gates of the fourth (M4B) and fifth (M4C) chopper transistors, and wherein the second double chopping circuitry (43A) includes a second current source transistor ($M_{CAL1}$) coupled between the first reference voltage (GND) and sources (13A) of seventh (M1A) and eighth (M1B) chopper transistors, the second tone injector circuitry (43A) also including a ninth chopper transistor (M2A) having a source coupled to a drain of the first chopper transistor (M1A) and a drain coupled to the first terminal (7A) of the first resonant circuit (3A), a tenth chopper transistor (M2B) having a source coupled to the drain of the first chopper transistor (M1A) and a drain coupled to the second terminal (7B) of the first resonant circuit (3A), an eleventh chopper transistor (M2C) having a source coupled to a drain of the second chopper transistor (M1B) and a drain coupled to the first terminal (7A) of the first resonant circuit (3A), and a twelfth chopper transistor (M2D) having a source coupled to the drain of the second chopper transistor (M1B) and a drain coupled to the second terminal (7B) of the first resonant circuit (3A), the first chopping signal $\cos(\omega_{LO}t)$ being also coupled to a gate of the eighth chopper transistor (M1B), the second chopping signal $-\cos(\omega_{LO}t)$ being also coupled to a gate of the seventh chopper transistor (M1A), a sixth chopping suave $\cos(\omega_{BB1}t)$ being coupled to gates of the ninth (M2A) and twelfth (M2D) chopper transistors, and a seventh chopping signal $-\cos(\omega_{BB1}t)$ being coupled to gates of the tenth (M2B) and eleventh (M2C) chopper transistors, wherein $\omega_{BB1} \gg (\omega_{BB2}-\omega_{BB1})$, where $\omega_{LO}$ is the angular frequency of the first chopping signal $\cos(\omega_{LO}t)$, $\omega_{BB1}$ is the angular frequency of the sixth chopping signal $\cos(\omega_{BB1}t)$, and $\omega_{BB2}$ is the angular frequency of fourth chopping signal $\cos(\omega_{BB2}t)$.

In one embodiment, the first tone generation circuit (38B) operates to calibrate intermodulation in the transceiver circuit.

In one embodiment, the transceiver circuitry includes a power amplifier (20) having inputs coupled to the first (7A) and second (7B) terminals of the first resonant circuit (3A) and also including mixer circuitry (8,9,44) for generating the in-phase signal (I) and the quadrature-phase signal (Q), the first tone generation circuit (38C) including first double chopping circuitry (43) including first chopping circuitry (M3A, M3B) chopping a calibration current ($I_{CAL}$) in response to a first chopping signal $\sin(\omega_{BB}t)$ and also including second chopping circuitry (M4A,B,C,D) chopping outputs of the first chopping circuitry (M3A,M3B) in response to a second chopping signal $\sin(\omega_{LO}t)$, wherein outputs of the second chopping circuitry (M4A,B,C,D) are injected into an interface (7A,7B) between the power amplifier (20) and the mixer circuitry (8,9,44), the first tone generation circuit (38C) also including second double chopping circuitry (43A) including first chopping circuitry (M1A,M1B) chopping a second calibration current ($I_{CAL}$) in response to a third chopping signal $\cos(\omega_{BB}t)$ and also including second chopping circuitry (M2A,B,C,D) chopping outputs of the first chopping circuitry (M1A,M1B) in response to a fourth chopping signal $\cos(\omega_{LO}t)$, wherein outputs of the second chopping circuitry (M2A,B,C,D) are injected into the interface (7A,7B) between the power amplifier (20) and the mixer circuitry (8,9,44), where $\omega_{BB}$ is a baseband angular frequency and $\omega_{LO}$ is a local oscillator angular frequency. In one embodiment, the first double chopping (43) includes a first current source transistor ($M_{CAL}$) coupled between a first reference voltage (GND) and sources (13) of first (M3A) and second (M3B) chopper transistors, the first double chopping circuitry (43) also including a third chopper transistor (M4A) having a source coupled to a drain of the first chopper transistor (M3A) and a drain coupled to the first terminal (7A) of the first resonant circuit (3A), a fourth chopper transistor (M4B) having a source coupled to the drain of the first chopper transistor (M3A) and a drain coupled to the second terminal (7B) of the first resonant circuit (3A), a fifth chopper transistor (M4C) having a source coupled to a drain of the second chopper transistor (M3B) and a drain coupled to the first terminal (7A) of the first resonant circuit (3A), and a sixth chopper transistor (M4D) having a source coupled to the drain of the second chopper transistor (M3B) and a drain coupled to the second terminal (7B) of the first resonant circuit (3A), the fourth chopping signal $\cos(\omega_{LO}t)$ being coupled to an input of the mixer circuit (44), the first chopping signal $\sin(\omega_{BB}t)$ being applied to a gate of the second chopper transistor (M3B), a fifth chopping signal $-\cos(\omega_{LO}t)$ being coupled to another input of the mixer circuit (44), a sixth chopping signal $-\sin(\omega_{BB}t)$ being coupled to a gate of the first chopper transistor (M3A), the second chopping signal $\sin(\omega_{LO}t)$ being coupled to gates of the third (M4A) and sixth (M4D) chopper transistors, and a seventh chopping signal $-\sin(\omega_{LO}t)$ being coupled to gates of the fourth (M4B) and fifth (M4C) chopper transistors, and wherein the second double chopping circuitry (43A) includes a second current source transistor ($M_{CAL}$) coupled between the first reference voltage (GND) and sources (13A) of seventh (M1A) and eighth (M1B) chopper transistors, the second tone injector circuitry (43A) also including a ninth chopper transistor (M2A) having a source coupled to a drain of the first chopper transistor (M1A) and a drain coupled to the first terminal (7A) of the first resonant circuit (3A), a tenth chopper transistor (M2B) having a source coupled to the drain of the first chopper transistor (M1A) and a drain coupled to the second terminal (7B) of the first resonant circuit (3A), a eleventh chopper transistor (M2C) having a source coupled to a drain of the second chopper transistor (M1B) and a drain coupled to the first terminal (7A) of the first resonant circuit (3A), and a twelfth chopper transistor (M2D) having a source coupled to the drain of the second chopper transistor (M1B) and a drain coupled to the second terminal (7B) of the first resonant circuit (3A), the third chopping signal $\cos(\omega_{BB}t)$ being also coupled to a gate of the eighth chopper transistor (M1B), an eighth chopping signal $-\cos(\omega_{BB}t)$ being also coupled to a gate of the seventh chopper transistor (M1A), the fourth chopping signal $-\cos(\omega_{LO}t)$ being coupled to gates of the ninth (M2A) and twelfth (M2D) chopper transistors, and a ninth chopping signal $-\cos(\omega_{LO}t)$ being coupled to gates of the tenth (M2B) and eleventh (M2C) chopper transistors.

In one embodiment, the invention provides a method for reducing power consumption and improving dynamic range of integrated circuit transceiver circuitry (2) which includes an in-phase signal (I) and a quadrature-phase signal (Q), the method including providing a first resonant circuit (3A) coupled to a narrowband interface (6,7A,7B,21) between a first amplifier (3,20) and an interfacing circuit (4,8,9,44), the first resonant circuit (3A) including a programmable first reactive element (C) and a second reactive element (L) which together determine a resonant frequency of the first resonant circuit (3A); injecting tones over a range of frequencies into the first resonator circuit (3A) and sensing maximum amplitudes of one of the in-phase signal (I) and minimum amplitudes of the quadrature-phase signal (Q) or vice-versa; and adjusting the capacitance of the programmable first reactive element (C) in response to results of the amplitude sensing so as to shift the resonant frequency of the first resonant circuit (3A) from an erroneous value to a desired resonant frequency (fc).

In one embodiment the method includes providing the narrowband interface (6,7A,7B,21) as one of the group including an interface (6) between an impedance matching resonant network (4) and a low noise amplifier (3), an interface (21) between the matching resonant network (4) and a power amplifier (20), an interface (7A,7B) between the low noise amplifier (3) and mixer circuitry (8,9,44) and an interface (7A,7B) between the power amplifier (20) and the mixer circuitry (8,9,44).

In one embodiment, the first amplifier (3) is a low noise amplifier (3) including input circuitry which includes a programmable input transistor array (M1A) including a group of parallel-connected binary weighted transistors (M1-0,1,2,3) the method including controlling transistors of the programmable input transistor array (M1A) to adjust the conductance of the programmable transistor array (M1A) to improve impedance matching between a second resonant circuit (4) coupled between a control electrode (6) of the programmable transistor array (M1A) and an RF signal source (5).

In one embodiment, the method includes operating control circuitry (25,27,30,33) and amplitude sensing circuitry (42) to search for selection codes for adjusting the capacitance of the programmable first reactive element (C) and the conductance of the programmable first transistor array (M1A) so as to calibrate the resonant frequency of the first resonant circuit (3A) and the resonant frequency of a second resonant circuit (4), respectively, to desired resonant frequencies.

In one embodiment, the method includes operating mixer circuitry (8,9,44) to generate the in-phase signal (1) and the quadrature-phase signal (Q) and operating double chopping circuitry (43) including first chopping circuitry (M3A,M3B) chopping a calibration current ($I_{CAL}$) in response to a first chopping signal $\cos(\omega_{LO}t)$ and also including second chopping circuitry (M4,A,B,C,D) chopping outputs (12A,12B) of the first chopping circuitry (M3A,M3B) in response to a second chopping signal $\cos(\omega_{BB}t)$, the method including injecting output signals of the second chopping circuitry (M4,A,B,C,D) into the narrowband interface (7A,7B).

In one embodiment, the method provides a system for reducing power consumption and improving dynamic range of integrated circuit transceiver circuitry (2) which includes an in-phase signal channel (I) and a quadrature-phase signal channel (Q), the system including a first resonant circuit (3A) coupled to a narrowband interface (6,7A,7B,21) between a first amplifier (3,20) and an interfacing circuit (4,8,9,44), the first resonant circuit (3A) including a programmable first reactive element (C) and a second reactive element (L) which together determine a resonant frequency of the first resonant circuit (3A); means (38,39) for injecting tones over a range of frequencies into the first resonator circuit (3A) and means (42) for sensing simultaneously maximum amplitudes of one of the in-phase signal (I) and the minimum amplitude of the quadrature-phase signal (Q) or vice-versa; and means (30) for adjusting the capacitance of the programmable first reactive element (C) in response to results of the amplitude sensing so as to shift the resonant frequency of the first resonant circuit (3A) from an erroneous value to a desired resonant frequency (fc).

DETAILED DESCRIPTION OF THE PREFERRED EMBODIMENTS

Built-in self-testing circuitry and methodology in an integrated circuit RF transceiver combine to automatically compensate for integrated circuit manufacturing process variations that are within worst-case (but not necessarily precisely known) values and also to compensate for chip temperature variations so as to maintain a high Q (qualify) factor of tank circuits in the transceiver, substantially reduce power consumption, and improve the dynamic range and tuning accuracy of the transceiver.

Figure 2:
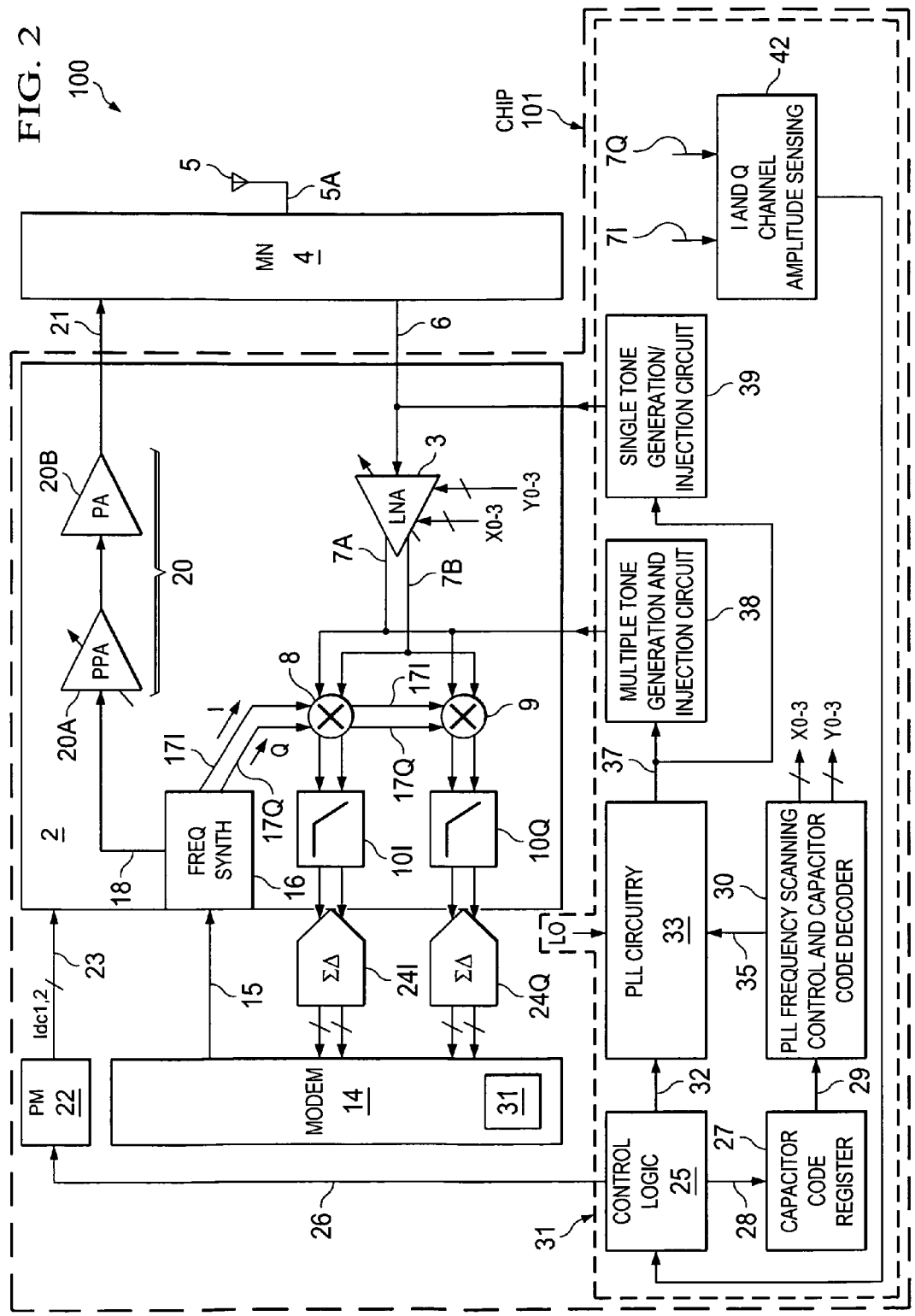
FIG. 2 is a block diagram of a low power, high dynamic range integrated circuit RF transceiver in accordance with the present invention.

FIG. 2 illustrates a low-power, high dynamic range RF transceiver system 100 including an integrated circuit RF transceiver chip 101 and an external impedance matching network 4 which is connected to an external antenna 5. Transceiver-chip 101 in FIG. 2 includes a typical low-power RF front end circuit 2 coupled by impedance matching network 4 to antenna 5. A modem 14 is coupled to a "quadrature-phase channel" or "Q signal" channel of transceiver front end circuit 2 by means of a delta sigma ADC (analog to digital converter) 24Q and also is coupled to the associated "in-phase channel" or "I signal" channel of transceiver front end circuit 2 by means of another delta sigma ADC 24I. A power management circuit 22 provides accurate DC voltages and DC currents that are required in transceiver front end circuit 2. In FIG. 2, impedance matching network 4 is the interface between antenna 5 and transmitter power amplifier 20B and also is the interface between antenna 5 and receiver LNA 3. Impedance matching network 4 is a nearly lossless, passive transforming device designed to match the antenna impedance to the input impedance of LNA 3 in an inexpensive, low cost RF transceiver operation. In the receive (RX) mode of transceiver chip 101, impedance matching network 4 matches the antenna impedance simultaneously to the ON or "powered up" impedance of LNA 3 and the OFF or "powered down" impedance of power amplifier 20B). In the transmit (TX) mode of transceiver chip 101, impedance matching network 4 matches the antenna impedance simultaneously to the OFF or "powered down" impedance of LNA 3 and the ON or "powered up" impedance of power amplifier 20B).)

Precise voltages and currents are generated from power management circuit 22 of FIG. 2 on the basis of the intrinsic bandgap voltage of silicon. Crystal oscillation frequencies are known to be very accurate because they are determined by the characteristics of the crystal material. The self-test and self-calibration system described herein relies on the accuracy of these material parameters.

Figure 1:
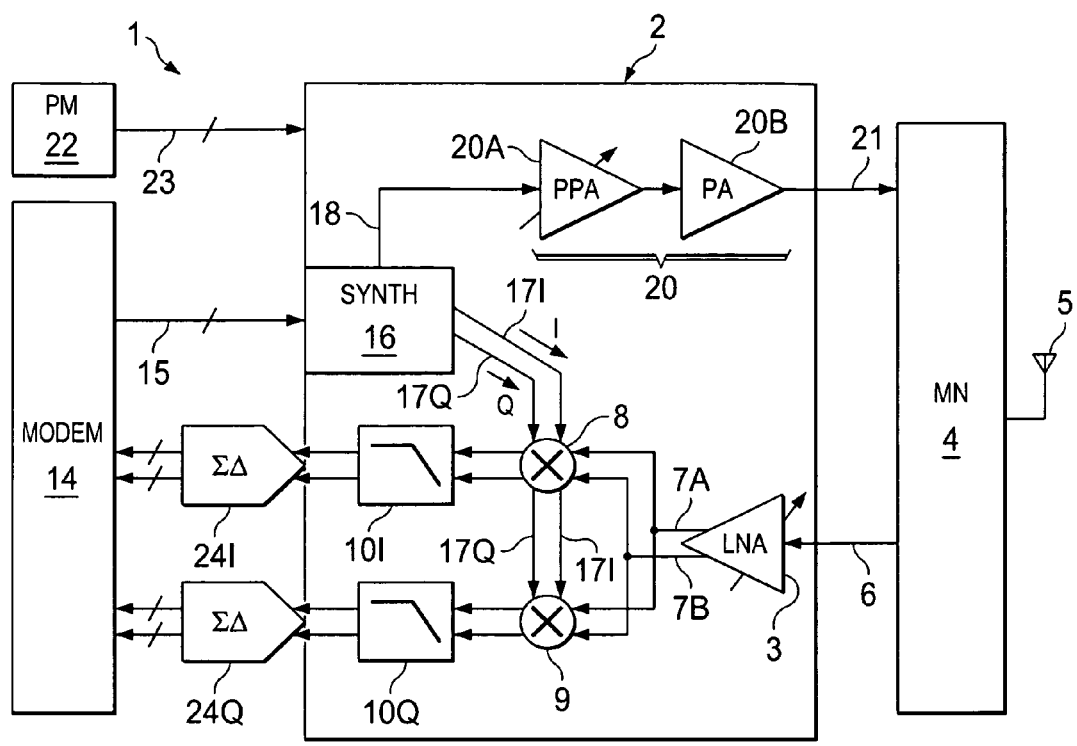
FIG. 1 is a block diagram of a conventional RF transceiver.

As in Prior Art FIG. 1, front end RF transceiver circuit 2 includes a LNA (low noise amplifier) 3 having its input coupled by conductor 6 to impedance matching network 4 and a first output coupled by a conductor 7A to a first input of each of mixers 8 and 9. (As shown in subsequently described FIG. 3, LNA 3 includes a programmable resonator or tank circuit 3A as a load circuit.) A second output of LNA 3 is connected by conductor 7B to a second input of each of mixers 8 and 9. As shown in subsequently described FIG. 3, both outputs 7A and 7B of LNA 3 are coupled to the power supply through an on-chip inductor or an off-chip inductor, to improve the dynamic range. A third input of each of mixers 8 and 9 is connected by bus or conductor 17I to receive an analog in-phase signal I generated by a digital frequency synthesizer 16, and a fourth input of such of mixers 8 and 9 is connected by bus 17Q to receive an analog quadrature-phase Q signal generated by frequency synthesizer 16. The differential output produced by mixer 8 is provided as an input to a low pass filter 10I, the output of which is coupled to the differential input of sigma delta ADC 24I, and the differential output produced by mixer 9 is provided as an input to a low pass filter 10Q, the output of which is coupled to the differential input of delta sigma ADC 24Q.

An output of modem 14 is connected by digital bus 15 to an input of frequency synthesizer 16. An analog output of frequency synthesizer 16 is connected by conductor 18 to an input of an adjustable gain pre-power-amplifier PPA 20A, the output of which is connected to the input of a conventional power amplifier (PA) 20B. The output of power amplifier 20B is connected by conductor 21 to an input of resonant impedance matching network 4.

Transceiver chip 101 includes a power amplifier interface in the transmitter front-end and an LNA/mixer interface in the receiver front-end. (In case of phase/frequency modulated transmitters, transmit modulation is realized in the frequency synthesizer, while in the case of amplitude modulated transmitters, a mixer/PA interface can be used. As illustrated in FIG. 2, the LNA/matching network interface and PA/matching network interfaces represent series L/C resonance, and the LNA/mixer interface and the mixer/PA interface (in the case of amplitude modulated transmitters) represent parallel L/C resonance.

RF transceiver chip 101 also includes circuitry for automatically self-calibrating the LC tank circuit 3A (FIG. 3) and impedance matching network 4 at the LNA input conductor 6, and also for automatically self-calibrating the LC tank circuit to the internal resonant load circuit or tank circuit 3A of LNA 3, at the LNA/mixer interface node 7A.

Modem 14 typically (but not necessarily) includes the circuitry included in block 31, including control logic 25, capacitor code register 27, PLL (phase locked loop) circuitry 33, PLL frequency scanning control and capacitor code decoding circuitry 30, multiple tone generation injection circuit 38, single tone generation/injection circuit 39, and I and Q channel amplitude sensing circuitry 42. However, for clarity the various functions of modem 14 are illustrated outside of block 14 (i.e., in block 31). The signal amplitude sensing functionality may be referred to as a Receive Signal Strength Indicator (RSSI).

In FIG. 2, the narrow band LNA/PA interface is accessible via LNA input conductor 6, and the LNA/mixer interface is accessible via LNA output conductor 7A (and/or output conductor 7B). PLL frequency scanning control circuit 30 generates the desired RF frequency. The capacitor array digital selection codes or words X0,X1,X2,X3 are controlled by modem 14 according to the response to the amplitude information obtained by the receiver down-conversion corresponding to the injected tone at the LNA/mixer interface 7A and/or 7B. For wideband frequency coverage, this is performed both for the high side of the frequency band and the low side of the frequency band. Similarly, transistor array selection stands or codes are controlled by modem 14 according to the response to the amplitude obtained by the receiver down-conversion corresponding to the injected tone at the LNA/matching network interface 6.

A signal generation chain including LNA output 7A, mixer/multiplier 8, low pass filter 10I, ADC 24I, modem 14, and frequency synthesizer 16, and another signal generation chain including LNA output 7B, mixer/multiplier 9, low pass filter 10Q, ADC 24Q, modem 14, and frequency synthesizer 16, provide multiple phases of high frequency, spectrally pure clock signal waveforms needed to operate mixers 8 and 9 so as to up-convert signals from a low frequency domain to a high frequency domain and/or down-convert signals from a high frequency domain to a low frequency domain. The clock signal waveforms are phase-locked to the output signal LO of an external reference crystal oscillator (not shown) which is applied as an input to PLL circuit 33.

Since the in-phase signal I and the quadrature-phase signal Q are 90 degrees out of phase, at resonance, the phase shift resulting from the impedance of an LC tank circuit or resonator receiving the I and Q signals is zero. Due to down-conversion of the orthogonal-phase signals I and Q, one of them has a maximum output amplitude at the same time the other has a null or minimum amplitude. Transceiver front end circuitry 2 is narrow-band in nature and depends heavily on the performance of the above-mentioned integrated circuitry.

The inductance of an integrated tank circuit or resonator is very dependent on its inductor geometry, and the capacitance of the resonator circuit is very dependent on process "corner" (i.e., specified maximum and minimum values of temperature and integrated circuit process parameters) characteristics of modern integrated circuit silicon technologies, and the inductor quality factor Q is very dependent on chip temperature. As previously mentioned, the resonant frequencies of conventional resonator circuits vary substantially with integrated circuit manufacturing process parameter variations and the signal swing at resonance varies substantially with variations in chip temperature.

To reduce the current consumption of RF transceiver front end circuit 2, the resonators at the two above-mentioned narrow band interfaces (i.e., conductors 6 and 7A and/or 7B) each must have a high Q factor. High Q factor resonator circuits are critical to low power transceiver systems, and high Q factor resonator circuits also are critical to improving the dynamic range per unit current consumption of transceivers. Wireless RF systems typically are narrow band in nature, but in specific cases they are operable over wide frequency range in which individual signal channels can be very narrow band in nature. A high Q factor of a tank circuit results in filtering of unwanted disturbances such as interference to a radio system, and improves the sensitivity of the RF receiver part of RF front end circuit 2 and also improves the efficiency of the power amplifier in the transmitter part of the RF front end circuit 2. The Q factor of a narrow band circuit consists of components of opposite reactance (usually inductive and capacitive reactances). An array of linear capacitors is usually utilized to trim the capacitance component of an LC resonator so as to compensate for integrated circuit manufacturing process variations of the resonance frequency.

Power management module 22 may generate the precision voltages and currents needed by the various circuit blocks of RF transceiver chip 101 in order to accomplish the self testing and calibration in the described embodiment of the present invention. Frequency synthesizer 16 provides accurate system clock signals for generating the in-phase signal I and quadrature-phase signal Q. Mixers 8 and 9 perform analog multiplication, and can be configured so as to provide both frequency down-conversion for the receiver and frequency up-conversion for the transmitter.

In the transmitter path of RF front end circuit 2, the frequency of the transmitted information is always known because it is generated on-chip, whereas in the receiver path there is a wide range of incoming information and associated frequencies from which signals of the desired frequencies must be extracted. The receiver part of RF front end circuit 2 selects the desired band and then passes the desired signal and rejects all other signals outside of the desired band. Usually the level of the received RF signal is dependent on its distance from the transmitter and can range from several microvolts to a number of millivolts, and is processed using multiple stages to progressively amplify the weak signal and at the same time reject unwanted signals. The received signal extraction function is conventional and can be accomplished by digital signal processing that is provided in a conventional implementation of frequency synthesizer 16 using various conventional state machines, logic circuits, etc.

Frequency synthesizer 16 also performs the basic carrier frequency generation for transceiver chip 101. In the transmitter section of transceiver chip 101, modem 14 forms various data packets to be transmitted so they conform to a suitable standard, such as the Bluetooth low energy standard or the IEEE 802.15.4 standard. Modem 14 also provides the basic functionality of the receiving section of transceiver chip 101, receiving raw data and demodulating it. The front end of modem 14 converts the raw data into suitable formats, symbols, or the like. The output of modem 14 presents a digital signal to an analog interface to configure various parameters related to amplitude and/or frequency, which in this case includes frequency synthesizer 16, but in another case modem 14 might present a digital signal which is processed by digital to analog conversion and an analog reconstruction filter then is provided to a mixer configured as a frequency up-converter to generate RF signals.

Figure 3:
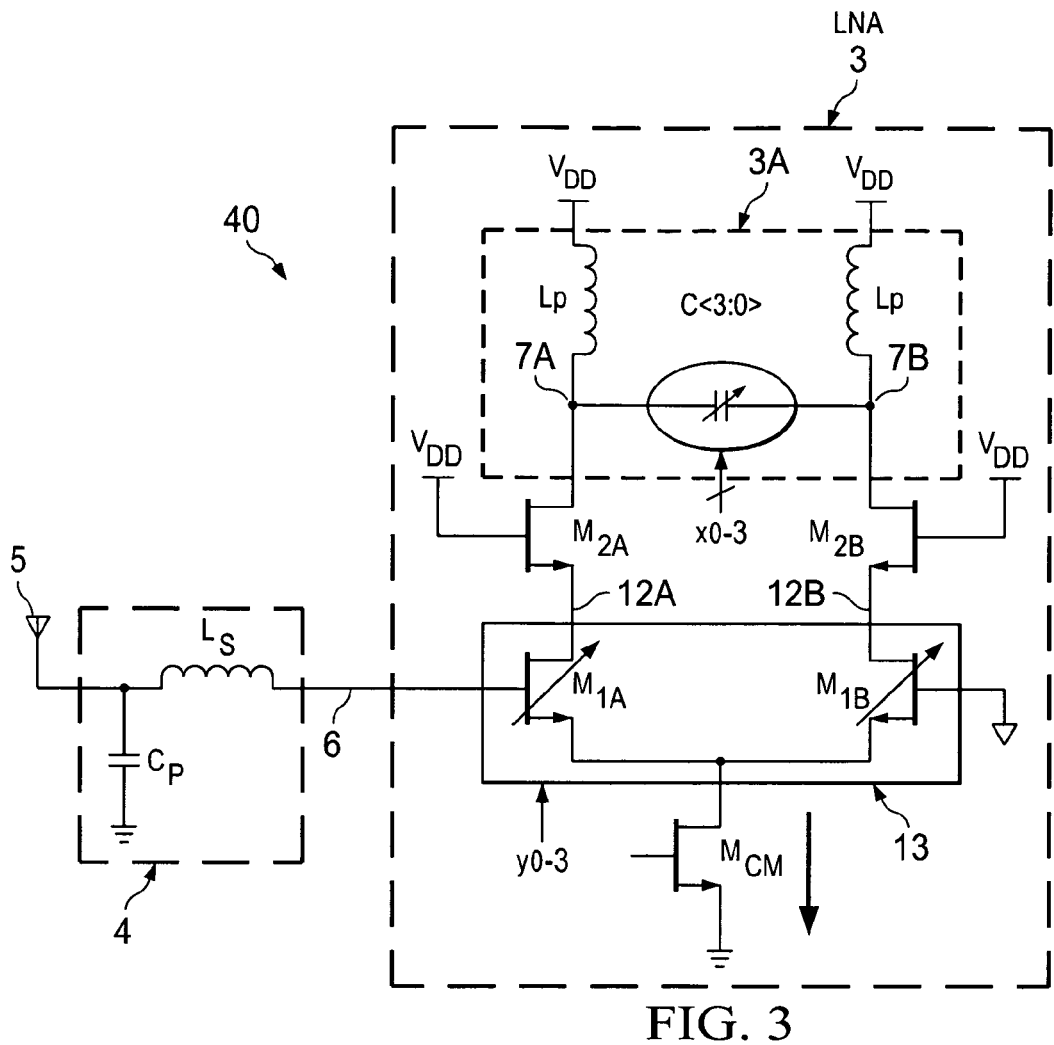
FIG. 3 is a schematic diagram illustrating tone injection at the input of LNA (low noise amplifier) 3 in FIG. 2, including an LC tank circuit and using an on-chip a programmable capacitor array and tunable input transistor array and a tail current source.

Referring to FIG. 3, circuitry 40 includes a schematic diagram of on-chip LNA 3 and off-chip impedance matching network 4. LNA 3 Includes an on-chip LC tank circuit 3A including inductor $L_S$ and capacitor $C_P$. LNA 3 includes N-channel tail current transistor $M_{CM}$ coupled between ground and conductor 13. The gate of transistor $M_{CM}$ comes front a current mirror controlled by power management circuit 22. Conductor 13 is connected to the drain of tail current transistor $M_{CM}$ and the sources of "programmable" N-channel input transistors M1A and M1B. The gate of input transistor M1A is connected to one terminal of inductor $L_S$. The other terminal of inductor $L_S$ is connected to antenna 5 and to one terminal of capacitor $C_P$, the other terminal of which is connected to ground.

Figure 3A:
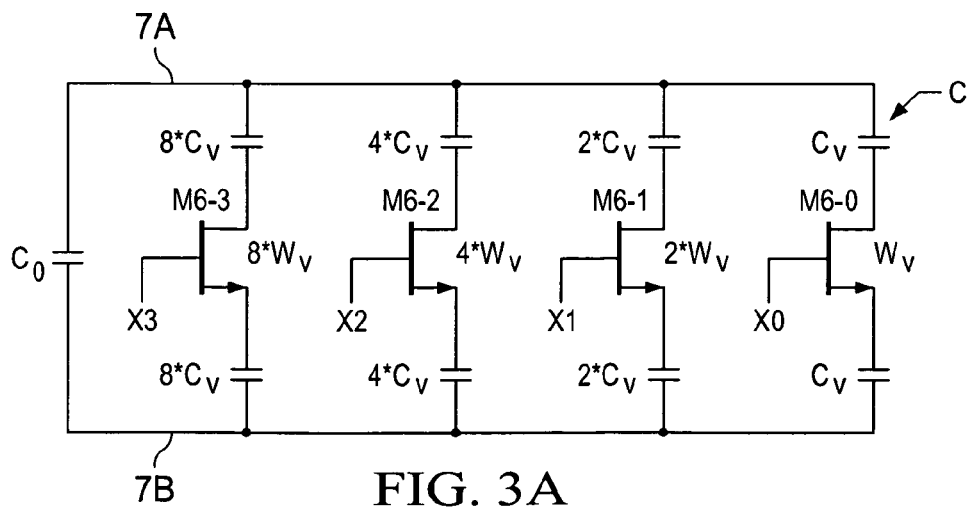
FIG. 3A is a schematic diagram of the programmable capacitor array C in FIG. 2.

The drain of input transistor M1A is connected by conductor 12A to the source of a N-channel cascade transistor M2A, the gate of which is connected to $V_{DD}$. Similarly, the drain of input transistor M1B is connected by conductor 12B to the source of N-channel cascade transistor M2B, the gate of which is connected to $V_{DD}$. The drain of cascode transistor M2A is connected by interface conductor 7A to LA tank circuit 3A. Tank circuit or resonator 3A includes a first inductor $L_p$ coupled between conductor 7A and $V_{DD}$ and a second inductor $L_p$ coupled between conductor 7B and $V_{DD}$. (In the case of a fully differential implementation, a single differential inductor (i.e., an inductor coupled between two conductors carrying a differential signal) can be connected between the two drain terminals 7A and 7B with the middle point connected to $V_{DD}$. Previously mentioned programmable capacitor array C (of capacitance C) is coupled between LNA output conductors 7A and 7B. As shown in FIG. 3A, programmable capacitor array C includes a plurality of binary weighted capacitors of capacitances CV, 2Cv, 4Cv, and 8Cv, coupled between LNA output conductor 7A and the drains of a plurality of binary weighted N-channel switching transistors M6-0, M6-1, M6-2, and M6-3 having channel widths Wv, 2Wv, 4Wv, and 8Wv, respectively. Programmable capacitor array C also includes a plurality of binary weighted capacitors Cv, 2Cv, 4Cv, 8Cv, etc, coupled between LNA output conductor 7B and the sources of binary weighted N-channel switching transistors Wv, 2Wv, 4Wv, 8Wv, etc., respectively. The gates of switching transistors M6-0, M6-1,0 M6-2, and M6-3 are coupled to selection signals generated by modem 14 according to the response to the amplitude obtained via selection conductors X0, X1, X2, and X3 (see FIG. 2), respectively, by the receiver down-conversion corresponding to the injected tone at the LNA/mixer interface node 7A.

In FIG. 3 there are two different resonant matching circuits, one formed by transistor M1A and off-chip matching network resonator 4, and one formed by transistor M2A and on-chip resonator 3A. Trimming or adjusting the capacitance C of the tank circuit 3A does not involve "programmable" transistor M1A, which is only used to adjust the input interface matching on conductor 6 with off-chip matching network 4. The two resonances and interfaces are separate.

Figure 3B:
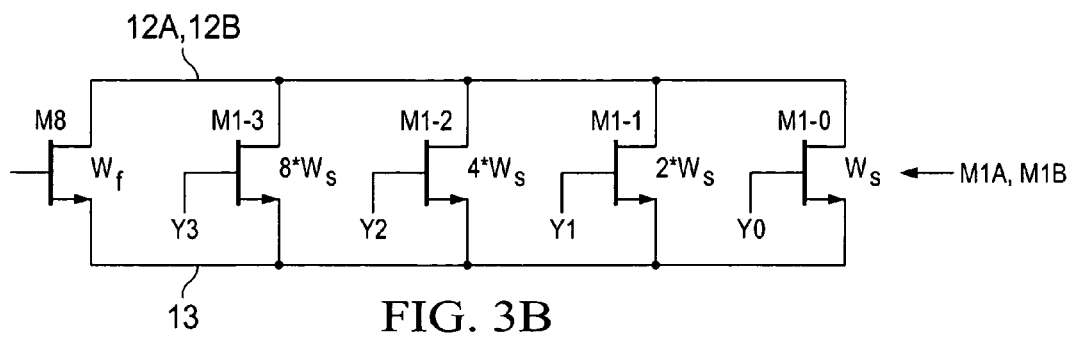
FIG. 3B is a schematic diagram of a tunable LNA input transistor as indicated in FIG. 3.

As shown in FIG. 3B, each of programmable or trimmable input transistors M1A and M1B includes 4 parallel-connected binary weighted N-channel transistors M1-0, M1-1, M1-2, and M1-3 of channel widths Ws, 2Ws, 4Ws, and 8Ws, respectively, and another N-channel transistor M8 with channel width Wf coupled between conductor 13 and either conductor 12A or conductor 12B. The gates of the transistors M1-0, M1-1, M1-2, and M1-3, are coupled to selection signals generated by modem 14 according to the response to the amplitude information obtained via selection conductors X0, X1, X2, and X3, respectively, by the receiver down-conversion corresponding to the injected tone at the LNA/matching network interface as previously mentioned. Alternatively, in FIG. 3B binary weighted capacitors, which, can be referred to as Cs, 2Cs, 4Cs, 8Cs, etc., could be coupled, between conductor 6 and the ground terminal in parallel to a fixed width transistor M1A to accomplish frequency tuning of the series resonance L/C circuit of the input matching network.

In the example of FIG. 3, LC tank circuit 3A includes the above mentioned binary weighted programmable on-chip capacitor array C connected between two inductors $L_p$. Irrespective of whether the tank circuit inductor and capacitor structures in FIG. 3 are used in series or parallel configurations, resonance of tank circuit 3A occurs at a well defined center frequency fc determined by the square root of the reciprocal of the product of the inductance and capacitance. The impedance of tank circuit 3A at its resonant frequency fc introduces no phase delay, and tank circuit 3A has a voltage gain or a current gain, depending on whether it is a series LC resonator or a parallel LC resonator. The resonance frequency fc of resonator 3A varies substantially due to integrated circuit manufacturing process variations and the impedance at resonance varies substantially with respect to temperature at a specific process corner. (It should be appreciated that the integrated circuit chip 101 may be manufactured by various semiconductor foundries, and the variations in certain process parameter values and specified ranges differ for the various foundries. The term "process corner" refers to the highest amount of variation there can be across all of the foundries for a particular technology. The process corners can be interpreted as the real-world boundaries of process parameter variation.)

The circuitry shown in FIGS. 2 and 3 is based on the fact that wireless RF receivers are fundamentally narrow band receivers and maximum filtering of signals is required in order to receive a narrow band signal. If the Q factor of tank circuit 3A in FIG. 3A (which is a function of chip area, and other parameters) can be made sufficiently high by increasing the impedance of tank circuit 3A at its resonant frequency fc, then low power dissipation and low noise receiver operation can be achieved. This is very beneficial because it improves the dynamic range per unit power consumption of the signal processing block included in integrated circuit chip 101 (FIG. 2). (Dynamic range is the difference between the magnitude of the highest signal that is processed by a signal processing block and the noise contributed by that block; inductors having a high Q factor would present lower series resistance and offer much lower noise.) This is achieved by the relatively simple automatic self-testing and self-calibrating system including control logic 25, code register 27, PLL circuitry 33, PLL frequency scanning control and capacitor code decoder 30, multiple tone generation and insertion circuit 38, single tone generation/insertion circuit 39, and I and Q channel amplitude sensing circuitry shown in block 31, which all are typically located inside modem 14 in the same transceiver chip 101 along with RF front end circuitry 2, as shown in FIG. 2.

At the selectable narrow bandwidth interface nodes including power amplifier output conductor 21, LNA input conductor 6, and LNA output conductor 7A (also see FIG. 2), a resonant parallel or series LC resonator can either boost the voltage or boost the current. (However, the resonator can not provide power gain because it is a passive circuit.) Tone injection circuit 38 in FIG. 2 is coupled to interface conductor 7A of LC resonator 3A in FIG. 3 to inject the tones of a range of frequencies to effectuate self-calibration of the programmable capacitor array Cp of LNA 3 to its desired center frequency fc and thereby provides on-chip tank, circuit 3A with an improved Q factor at its resonant frequency fc for the specific applicable process corner after the calibration is complete. In a narrowband system, it is desirable that tone injection circuit 38 (FIG. 2) accurately calibrate resonator 3A to its desired corner frequency in order to provide maximum dynamic range of integrated circuit chip 101 (FIG. 2).

Cascade transistors M2A and M2B in FIG. 3 provide adequate RF isolation of between the input conductor 6 and the LNA output terminals 7A and 7B. Therefore, the narrowband resonators associated with these nodes (series resonance in case of conductor 6 and parallel resonance at conductors 7A and 7B) can be independently calibrated. At a first interface node 6, which couples off-chip matching network 4 (Ls and Cp) to the gate of input transistor M1A, an impedance transformation is provided from the 50 ohms presented by the antenna cable 5A to the on-chip circuitry including LNA 3 and mixers 8 and 9 that are automatically programmed for optimum receiver sensitivity. The circuitry including LNA 3 and mixers 8 and 9 (see FIG. 2) provides a voltage conversion gain, and input transistor M1A converts the amplified voltage to current. That current flows through conductor 12A into the sconce of cascade transistor M2A (which provides unity current gain) and through interface conductor A into parallel LC resonant tank circuit 3A. The interface network at LNA input node 6 is a series resonant network. Input transistor M1A receives a gate voltage and converts it to current which flows through cascode transistor M2A to resonant tank circuit 3A by virtue of the high impedance of tank circuit inductance $L_p$ and tank circuit capacitance C at their resonant frequency. The other interface network at LNA output node 7A is a parallel resonant network and accomplishes, a current-to-current conversion gain.

During the self-calibration process, PLL circuitry 33 operates to cause generation of a range of tone frequencies that are injected into interface conductors 6 and 7A in the process of searching for optimum calibration of tank circuit capacitor array C and LNA input transistors M1A and M1B. Amplitude sensing circuitry 42 operates to detect resulting simultaneously the maximum voltage amplitudes of the in-phase signal I and the minimum voltage amplitude of the quadrature-phase signal Q which indicate when the resonators are accurately calibrated.

Figure 3C:
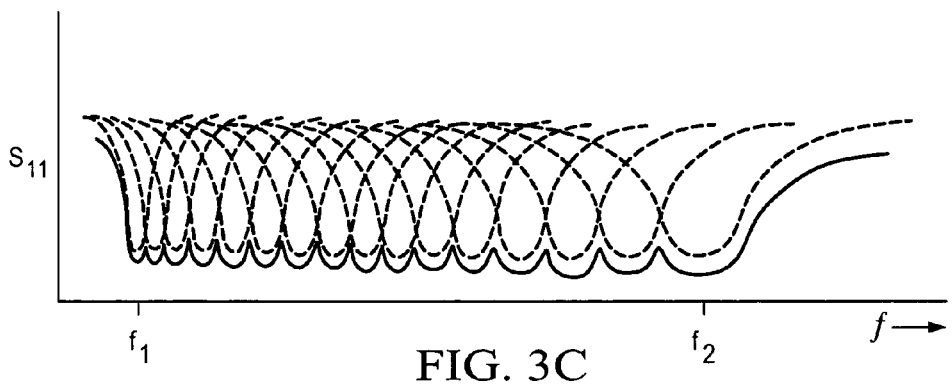
FIG. 3C is a graph indicating matching of antenna cable impedance to the input impedance of transistor M1A in FIG. 3.
Figure 3D:
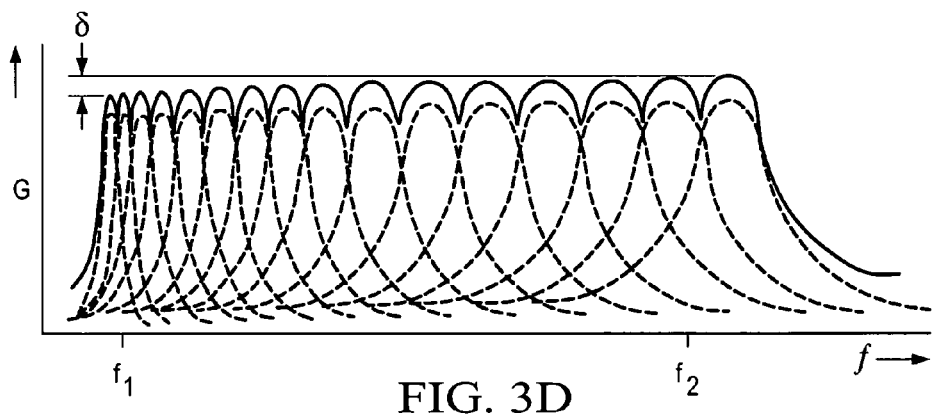
FIG. 3D is a graph of the gain versus frequency of the LNA in FIG. 3.

The circuitry of FIG. 3 is used to provide an on-chip mechanism for performing accurate calibration of the tank circuit 3A connected between the differential output nodes 7A and 7B of LNA 3 to "tune" the programmable capacitor array C so as to adjust the tank circuit capacitance C and hence its resonance frequency. The graph in FIG. 3C represents the input return loss of the receiver circuitry over a wide frequency range, and comes from the series resonance circuit at LNA input conductor 6 produced by matching network 4 and the tunable on-chip transistors M1-0, M1-1, M1-2, and M1-3 (FIG. 3B) and/or capacitors Cv, 2Cv, 4Cv, and 8Cv (FIG. 3A), FIG. 3D represents the overall voltage gain of the LNA (from input antenna port to differential signals on conductors 7A and 7B), wherein "G" represents the amount of gain variation over a wide frequency range, with gain variation caused as a result of the frequency-dependent Q factor over the wide frequency range.

In FIG. 3 LNA 3 is the main front-end amplifier of RF transceiver chip 101. The single tone injection circuit 39 in FIG. 2 is similar to what is shown in subsequently described FIG. 4. The operation of the subsequently described single-tone circuit 39 and multi-tone injection circuit 38 in FIG. 2 are similar in the sense that both use chopping mechanisms to obtain an RF signal in the signal current domain whose amplitude is proportional to the DC current denoted by $I_{CAL}$ in subsequently described FIG. 4. In the case of single-tone injection, transistors M4A, M4B, M4C, and M4D in subsequently described FIG. 4 can be eliminated and the DC signal can be chopped with respect to the main RF signal. In the case of dual injection, transistors M4A, M4B, M4C, and M4D in FIG. 4 are provided with the baseband signal and the result is a frequency mixing.

Figure 4:
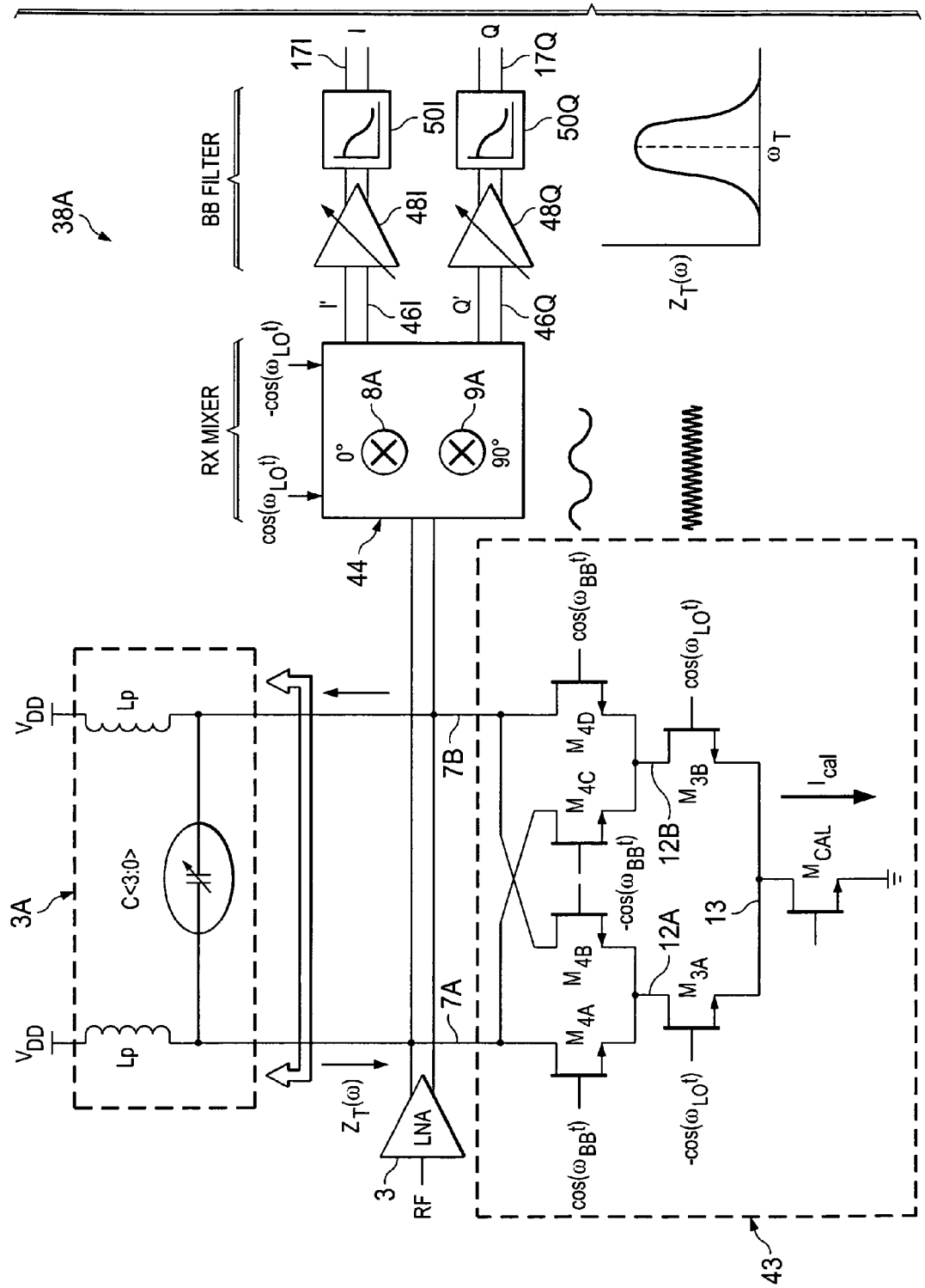
FIG. 4 is a schematic diagram illustrating tone injection at the output of low noise amplifier (LNA) 3 in FIG. 2.

FIG. 4 shows a low-power RF front end receiver 38A including a tone-injection circuit 43. The receiver (RX) section 38A may include multiple narrow band amplifiers in order to achieve a wideband frequency coverage. The overall receiver front end 38A uses multiple series or parallel resonances to achieve high dynamic range. The resonance tank circuits 3A and 4 (FIG. 3) are accurately calibrated to their maximum achievable Q factor, with the help of tone injection circuit 43. Tone injection circuit in 43 injects an RF signal, at an RF frequency generated by the PLL circuit 33 (FIG. 2), into the resonant tank circuits via conductors 7A and 7B. The amplitude of the injected RF signal is proportional to the DC current $I_{CAL}$. The tones of the injected RF signal are applied to on-chip resonator tank circuit 3A and off-chip matching network 4 with the lowest possible loading of the RF signals on conductors 7A, 7B, and 6.

Tone generator circuit 43 can be configured for tone injection for a single frequency RF signal, an AM modulated RF signal, or the sum of two RF tones separated by a narrow frequency span. The foregoing tones can be used, respectively, for (1) tuning narrowband resonance for maximum achievable quality factor Q, (2) RF and baseband calibration by varying RF and baseband frequencies applied to the structure, and/or (3) two-tone testing of RF amplifiers to obtain intermodulation information.

Tone injection circuit 43 can be used in the transmitter and/or receiver sections of RF transceiver chip 101 at multiple locations, and consumes very little integrated circuit chip area overhead. Tone injection circuit 43 also may be configured for testing reconfigurable transceiver architectures in which the transceiver circuitry can be configured for frequencies between zero and low IF (intermediate frequency).

In FIG. 4, tone generation circuit 38A (which can be used as tone generation circuit 38 in FIG. 2) shares tank circuit 3A with LNA 3 (as in FIG. 3). The outputs of LNA 3 (FIGS. 2 and 3) are connected by conductors 7A and 7B to tank circuit 3A, tone generation circuitry 43, and receive mixer circuitry 44. Tone generator circuit 38A also includes signal chopping tone generation circuitry 43, receiver (RX) mixer 44, adjustable-gain amplifiers 48I and 48Q, and low pass baseband filters 50I and 50Q. Chopper or tone injection circuitry 43 includes a tail current transistor $M_{CAL}$ and N-channel chopping transistors M3A, M3B, M4A, M4B, M4C, and M4D. (In this specific illustration, N-channel transistors have been used, but implementation using P-channel transistors is also possible.) The source of tail current source transistor $M_{CAL}$ is connected to ground and its drain is connected by conductor 13 to the sources of RF chopping transistors M3A and M3B. The current $I_{CAL}$ in transistor $M_{CAL}$ is a DC current. The chopping creates an RF current signal that is proportional to $I_{CAL}$ and is performed by the switching transistors M3A and M3b and M4A, M4B, M4C, and M4D. The gate of transistor M3A receives the local-oscillator-based high-frequency signal $-\cos(\omega_{LO}t+180°)$ which is of the opposite phase to that of the signal local-oscillator-based high-frequency signal $\cos(\omega_{LO}t)$ received by the gate of transistor M3B; $\omega_{LO}$ represents the local oscillator angular frequency in radians. The drain of chopping transistor M3A is connected by conductor 12A to the sources of chopping transistors M4A and M4B. The drain of input transistor M3B is connected by conductor 12B to the sources of chopping transistors M4C and M4D.

It should be understood that, depending on the specific built-in-self calibration methodology, the tone injection circuitry may be designed differently. For single one generation, chopping only with a high frequency LO (local oscillator) differential phase is sufficient and only transistors M3 and M3B are necessary. For an AM modulated RF signal generation with the LO (local oscillator) as the carrier, transistors M4A and M4B are necessary along with transistors M3A and M3B. For two tone generation, single sideband combination is necessary using the quadrature phases of both the LO and lose frequency signals.

With tone injection, circuit 38A of FIG. 4 configured to provide an AM modulated signal, transistor $M_{CAL}$ and chopping transistors M3A, M3B, M4A, M4B, M4C, and M4D operate from one phase of the PLL signal generated by PLL circuitry 33 (FIG. 2), so as to produce sinusoidal current waveforms for tones that are injected into the resonator interface nodes 7A and 7B. The gates of chopping transistors M4A and M4D receive a low-frequency local-oscillator-based baseband (BB) chopping signal $\cos(\omega_{BB}t)$, and the gates of chopping transistors M4B and M4C receive the corresponding low-frequency chopping signal $-\cos(\omega_{BB}t)$, which may be also derived from the on-chip crystal oscillator by dividing its frequency down by some integer ratio. The drains of chopping transistors M4A and M4C are connected by interface conductor 7A to one terminal of tank circuit 3A of FIG. 3A and an input of RX mixer 44. The drains of chopping transistors M4B and M4D are connected by interface conductor 7B to the other terminal of tank circuit 3A and another input of RX auxiliary mixer 44. (The conventional RF mixer 44 and baseband filters 50I and 50Q are typically used in most modern basic transceiver systems.)

The structure shown in FIG. 4 can calibrate both the L/C tank as well as the low frequency baseband signal. Two scenarios are possible. First, in the calibration of the L/C tank circuit 3A, a specific wireless standard spans from a low RF frequency $f_L$ to a high RF frequency $f_H$. The baseband frequency $\omega_{BB}$ is kept fixed. PLL circuit 33 is preprogrammed to generate the frequency $f_H$. The capacitor array programming bus are swept from low to high capacitance values to allow observation of a simultaneous maximum amplitude down-converted signal on one channel and a minimum down-converted signal on the other channel of two-conductor buses 17I and 17Q, respectively). The down-converted tone would be at a frequency defined, by $\omega_{BB}$, and since it is a low frequency tone, its magnitude can be detected by the modem 14 using a last Fourier transform (FFT). Next, PLL circuit 33 is re-programmed to generate a carrier frequency $f_L$. Subsequently, the capacitor array programming bits codes or words are swept from low to high capacitance values to observe simultaneous maximum amplitude and minimum amplitude signals. In this way, the optimum capacitor array bits needed for centering the L/C tank around the two extreme frequencies $F_L$ and $F_H$ are obtained. Any frequency between $f_L$ and $F_H$ will not need separate calibration, as the necessary capacitor settings for such in-between frequencies can be obtained by interpolation in a geometric mean fashion.

In another scenario, during calibration of the baseband filters the local oscillator frequency is kept fixed with the appropriate capacitor array setting obtained under the above described first scenario to ensure centering of the L/C tank circuit resonance at a desired RF frequency, and $\omega_{BB}$ is swept to obtain the baseband filter bandwidth (or RC time constant). After centering the L/C tank resonant frequency, a low frequency in-band tone $\omega_{BB1}$ is injected. The amplitude of this tone is much lower than the 3-dB bandwidth of the filter, and the corresponding down-convened signal amplitude at frequency $\omega_{BB1}$ is stored. Next, a tone at frequency $\omega_{BB2}$ equal to the desired cutoff if frequency of the filter is injected, and the values of the capacitor array bit codes or words in the baseband filters 50I and 50Q (both of which use the same capacitor structure and same number of trimming bits) are swept until the amplitude of the new down-converted tone of frequency $\omega_{BB2}$ at modem 14 is 3 dB lower than the amplitude obtained in case of $\omega_{BB1}$.

RX mixer 44 receives the two high-frequency signals cos ($\omega_{LO}t$) and $-\cos(\omega_{LO}t)$ as inputs and generates a differential in-phase channel signal I' between conductors 46I and a differential quadrature-phase channel signal Q' between conductors 46Q. The amplitude of the in-phase signal I' is appropriately adjusted by means of adjustable-gain amplifier 48I and is filtered by low pass baseband filter 50I to generate the in-phase "I signal" between conductors 17I, and the amplitude of the quadrature-phase signal Q' is appropriately adjusted by means of adjustable-gain amplifier 48Q and is filtered by low pass baseband filter 50Q to generate the quadrature-phase "Q signal" between conductors 17Q. The gain adjustment is performed by detecting the amplitude of the received signal using the received signal strength indicator (RSSI) 42 inside modem 14 and adjusting it to provide appropriate gain control input data to filters 48I and 48Q. The impedance function looking into tank circuit 3A from interface conductors 7A and 7B is represented by $Z_T(\omega)$, a graph of which is included in FIG. 4.

Equations (1) and (2) below provide expressions for the differential I' signal between the conductors 46I and the differential signal Q' between the conductors 46Q, respectively:

$$I'(t)=Ical\{\cos(\omega_{LO}t)\cos(\omega_{BB}t)\}Z_T(\omega_{LO})mix\cos(\omega_{LO}t) \quad \text{Eqn. (1)}$$

$$Q'(t)=Ical\{\cos(\omega_{LO}t)\cos(\omega_{BB}t)Z_T(\omega_{LO})mix\cos(\omega_{LO}t+90) \quad \text{Eqn. (2)}$$

While transceiver system 100 (FIG. 2) is in its main mode of operation, the small chopping switches M4A-D that are used to perform the above mentioned tone injection cause only minimal loading on the main transceiver circuitry when the chopping transistors are turned off. Therefore, they have negligible loading effect during the main mode of transceiver operation. The calibration of transceiver system 100 (FIG. 2) can be automatically performed anytime during its lifetime. Also, during prolonged operation of RF transceiver chip 101 its temperature may vary slowly, and using the above described self-calibration, the effects of circuit operation caused by any of the previously mentioned parameter variations may be essentially eliminated.

Since the phase delay caused by resonator impedance $Z_T(\omega)$ at resonance is zero, the sinusoidal current injected into interface node 7A and the associated voltage on node 7A are in phase. Once the frequency of the voltage on node 7A is down-converted by Rx mixer 44 with respect to the frequency of the quadrature-phase signals I and Q in the receive signal circuit chain including LNA 3 and mixers 8 and 9, one phase (for example, the I phase) has a maximum output voltage amplitude while the other phase (i.e., the quadrature-phase or Q phase) has a zero or minimum output voltage amplitude.

In the calibration phase, the PLL frequency can be swept over the required RF bandwidth and the tuning or adjustment of tank circuit capacitor array C may be performed so as to always "center" the resonators, and thereby maximize dynamic range of the transceiver. (Over the two foregoing frequency extremes $f_L$ and $f_H$ usually are sufficient to reduce calibration time.) For example, the frequency of the injected tone current waveform and associated voltage waveform on interface conductor 7A during the self calibration process can be "swept" over a desired range by means of PLL frequency scanning control circuit 30 and PLL circuitry 33 in a very precise manner so as to adjust the tank circuit resonance frequency fc. Thus, fine adjustment of the resonance frequency to the desired value fc may be quickly and accurately automatically performed any time during the file of transceiver system 100 by adjusting the capacitance of programmable tank capacitor array C. Calibration for the tank circuit resonance may be performed during power-up of the integrated circuit chip and prior to receiving data.

The self calibration process includes searching for suitable digital codes for the capacitor array which determine the output frequency from PLL circuit 33 at specific programmable frequency divider values, as indicated in the flowcharts of subsequently described FIGS. 6A-C. To accomplish this, programmable tank capacitor array C is initialized at a midrange setting of its capacitance range, and the outputs of the I and Q channels at the baseband frequency are stored. Then, a tank capacitance array code search is continued incrementally over the PLL frequency range being scanned until a maximum voltage amplitude (representing the present value of the injected tone) is detected by amplitude sensing circuit 42 for the I signal channel (assuming that chopping circuitry 43 is being operated from the I phase of the PLL output signal). The capacitor code corresponding to the maximum detected voltage amplitude is stored in register 27 (FIG. 2) and then utilized to adjust the capacitance of programmable capacitor array C (FIG. 3A).

The foregoing process is based on the fact that the orthogonal vectors corresponding to the I and Q signals generated by PLL circuitry 33 are a result of the inherent transfer function capability of a conventional modern receiver. For example, of an I signal or tone is injected into interface node 7A, a maximum amplitude of it appears in the I-signal channel when the tank circuit is tuned to resonance, and a minimum amplitude of it appears in the Q-signal channel at the same time. The amplitudes of one or both of the I signal and the Q signal are sensed by a receive signal strength indicator in block 42 inside modem 14 (FIG. 2), which effectively disables/disconnects the self calibration system if a simultaneous maximum amplitude of the I signal and/or null amplitude of the Q signal are detected. When that occurs, there is a zero phase shift being caused by tank circuit 3A, and at that point resonance of tank circuit 3A has been achieved and therefore self-calibration of the transceiver chip 101 has been accomplished.

The described method of detecting maximum signal amplitude at the in-phase channel and a minimum signal amplitude at the quadrature-phase channel allows determination of when resonance, and hence calibration, of tank circuit 3A has been achieved. The sizes of the chopping transistors may be made very small to avoid loading associated with the various calibration transistors. After self-calibration is complete, the chopping circuitry 43 is automatically disabled, and the minimum loading on the LNA input and the LNA outputs results in maximizing the dynamic range of transceiver system 100 with respect to various integrated circuit manufacturing process variations.

It should be noted that chopping with respect to the baseband frequency $\omega_{BB}$ may be provided in order to calibrate the baseband filter frequency response as well. It is desirable to precisely calibrate the baseband filter because modern wireless standards need to withstand strong adjacent channel blocker signals which need to be filtered out significantly prior to the demodulation of the tics sec signal. Similarly, other calibration tones can be injected at various other resonating interfaces along the transceiver architecture if this is deemed to be advantageous. An example of this would include the resonating tank at the mixer/PA interface. In an I/Q modulator based architecture, L/C baseband filters are needed for filtering wide bandwidth IF signals.

Figure 5:
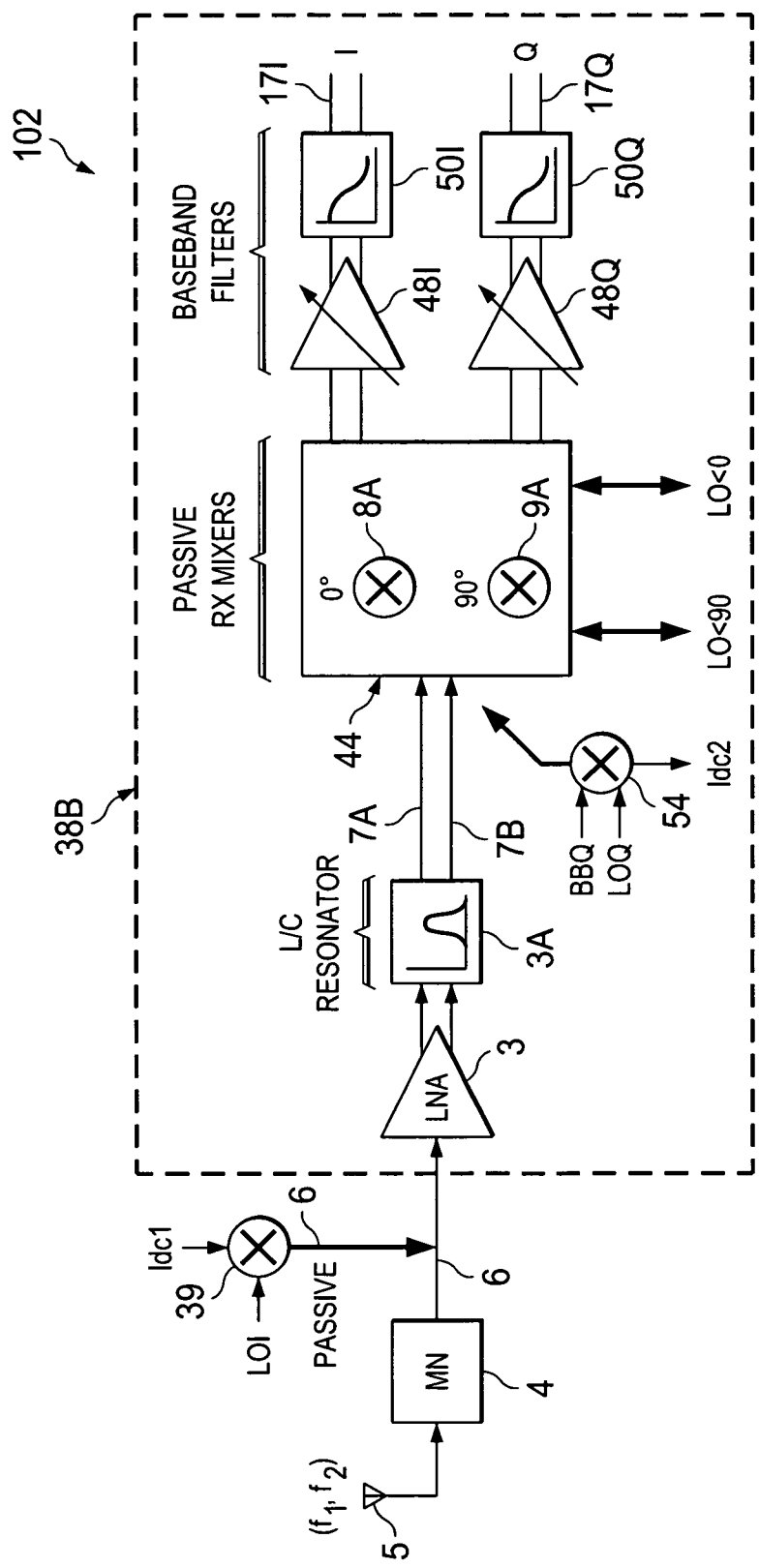
FIG. 5 a block diagram illustrating tone injection at both the input and output of low noise amplifies (LNA) 3 in FIG. 2.

FIG. 5 includes a block diagram of the above-mentioned tone injection circuitry which may be helpful in understanding the self calibration circuitry and process of RF transceiver circuit 101 of FIG. 2. Tone injection circuit 102 in FIG. 5 includes both single new generation circuit 39 of FIG. 2 (for example, to provide single tone injection at LNA input node 6) and multiple tone generation circuit 38 of FIG. 2 which provides multiple tone injection at LNA/mixer interface node 7A) both to calibrate tank circuit 3A and to calibrate the characteristics of baseband filters 48I and 48Q. Antenna 5 receives signals having a wide range of frequencies, including one signal having a frequency f1 and another signal having a frequency f2. An output of resonant matching network 4 is coupled by conductor 6 to single tone injection circuit 39, which injects a tone into LNA input conductor 6 (as also illustrated in FIG. 2). The outputs of LNA 3 are coupled by conductors 7A and 7B to on-chip LC tank circuit 3A and also to passive RX mixer 44 (meaning that the RX mixer 44 uses transistors as switches so the output current is a scaled down version of the input current and therefore does not provide gain), the same as shown in FIG. 4. The in-phase part of RX mixer 44 indicated by reference numeral 8A is coupled by adjustable gain amplifier 48I and baseband filter 50I to generate the a in-phase I signal. The quadrature-phase part of RX mixer 44 indicated by reference numeral 9A is coupled by adjustable gain amplifier 48Q and baseband filter 50Q so as to generate the quadrature-phase Q signal, as in FIG. 4.

FIG. 5 illustrates a situation wherein two choppers are placed at two narrowband interfaces, including at the matching network 4 interface, and also at the LNA/mixer interface. In order to maintain similar loading on the two phases, one phase (in this case, the phase of the in-phase signal I) can be used to calibrate for resonance at the matching network/LNA interface conductor 6, while the other phase (the quadrature-phase signal I) can be used to calibrate for resonance at the LNA/mixer interface conductors 7A and 7B. In order to facilitate both calibrations, the chopping circuitry shown in tone generation circuit 43 (FIG. 4) is placed twice and configured differently, because independent calibrations are required since the two resonator tanks may use dissimilar inductor types and both resonators should be separately centered for their individual optimum performance.

For single tone generation at RF frequency, the baseband low frequency signal from the chopping stack may be eliminated, and a DC current (designated by Idc1) is chopped with a designated phase (in-phase or quadrature-phase) to provide an RF signal. After down-conversion through RX mixer 44, the resultant signal has maximum amplitude in one channel and minimum amplitude in the other. However, in this specific case, no low frequency offset is provided during the chopping, so the resulting baseband signal falls to DC. In this case, a DC offset calibration should be performed before the case in order to avoid impairment due to the DC baseband signal, a low frequency ($\omega_{BB}$) offset can be used, which is down-converted at an IF baseband frequency, and modem 14 can perform a FFT (fast Fourier transform) function to obtain the signal amplitude.

As the RF signal frequency is varied by programming PLL circuit 33 (FIG. 2), the resonance frequency of tank circuit 3A (FIG. 4) is obtained as the frequency at which the maximum value of the down-converted signal strength occurs. Therefore, chopper 39 (also see FIG. 2) can be configured as a single tone chopper or multiple tone chopper, but in both cases, only the high frequency RF signal is changed and the low frequency signal remains fixed.

In the case of the dual chopper 54, it can calibrate the L/C resonance frequency in response to chopping by the local oscillator-based signal LOQ and can calibrate the baseband bandwidth using the same structure in response to chopping by the local oscillator-based chopping signal BBQ. When L/C resonance is to be optimized, the RF signal is programmed through PLL circuit 33, and when baseband bandwidth is to be optimized, then the optimum capacitor array result from the high frequency calibration is set, and the low frequency ($\omega_{BB}$) tone is set to some low in-band frequency (e.g., 100 kHz). The magnitude of the down-converted signal at the baseband frequency is stored by modem 14. Then, $\omega_{BB}$ is set to the desired 3 dB frequency value, and the capacitor code for the baseband filter is changed until modem 14 detects a signal magnitude of the down-converted tone at a 3 dB lower value.

Tone injection circuit 38B in FIG. 5 includes chopping circuitry 54 (similar to chopping circuitry 43 in FIG. 4) and double-chops a DC tail currant Idc2 (which is the same as $I_{CAL}$ in FIG. 4) to generate one tone at a frequency of local oscillator signal LOI for injection into LNA output conductors 7A and 7B to calibrate tank circuit 3A, and also injects a baseband tone at the frequency of local-oscillator based baseband signal BBQ to adjust the characteristics of baseband filters 50I and 50Q. The bidirectional arrows at the bottom of block 44 in FIG. 5 represent the two phases of the LO signal provided by PLL circuit 33 to the down-conversion mixers 8A and 9A. LO<0 indicates the in-phase signal, and "0" represents a phase shift of "0" degrees, and LO<90 indicates the quadrature-phase signal and a phase shift of 90 degrees.

Thus, FIG. 5 illustrates tone injection at two amplifier resonant node interfaces. First, the tone injection is performed at nodes 7A and 7B, which are at the LNA/mixer interface 7A, 7B which constitutes one resonating interface in the RF transceiver architecture. Then the PLL frequency is swept over a suitable range until a correct code is found which causes the tank circuit of matching network 4 to resonate at the desired center frequency fc and generate a maximum amplitude signal on conductor 7A, at which point the resonance peak has been achieved. The maximum amplitude is detected by I and Q channel amplitude sensing circuit 42 (FIG. 2), which causes the code search to be stopped. The above-mentioned additional chopping stack can be added in order to also inject a low frequency tone to calibrate the baseband frequency response, and the baseband filters 50I and 50Q can be calibrated by sweeping the frequency of this tone. (If multiple injection points are necessary, load balancing can be performed by equalizing the load capacitance at high frequency.) This implies that any chopping of tones to inject signals at RF frequency to calibrate L/C tank circuits will require an RF signal. Since there are two phases available (i.e., the in-phase signal and the quadrature-phase signal), different choppers can use different relative phases. For example, if there are two L/C resonances to be calibrated, one can use the "in-phase" RF signal and the other can use the "quadrature phase". Therefore, both of the phases see an almost equal loading, and this is also beneficial to avoid any cross-talk to the main PLL resulting from the circuits that are being tested.

Single tone injection to input conductor 6 of LNA 3 is accomplished by means of the single tone generation circuit 39 (also shown in FIG. 2), using very small chopper transistors so as to avoid appreciable loading on the RF signal. Noise is not very relevant since the calibration tone is already of high amplitude, so small transistors can be used. Since the currents generated by power management circuit 22 can be accurately calibrated during the chip power-up, an accurate estimate of the voltage gain of LNA 3 and the mixer-baseband filter combination can be obtained after the L/C resonance and bandwidth calibration have been performed. This estimate may be a very useful information for the receive operation.

It should be appreciated that if the calibration described is not performed, then there is a penalty of reduced voltage gain as a result of not operating at the tank circuit resonance frequency. A typical "safe" design" approach would be to reduce the Q factor, but if the design is provided with a lower Q factor (lower Q also implies broadband), then the current consumption would be higher. In contrast, the calibration in accordance with the present invention avoids such higher current consumption.

Figure 6A:
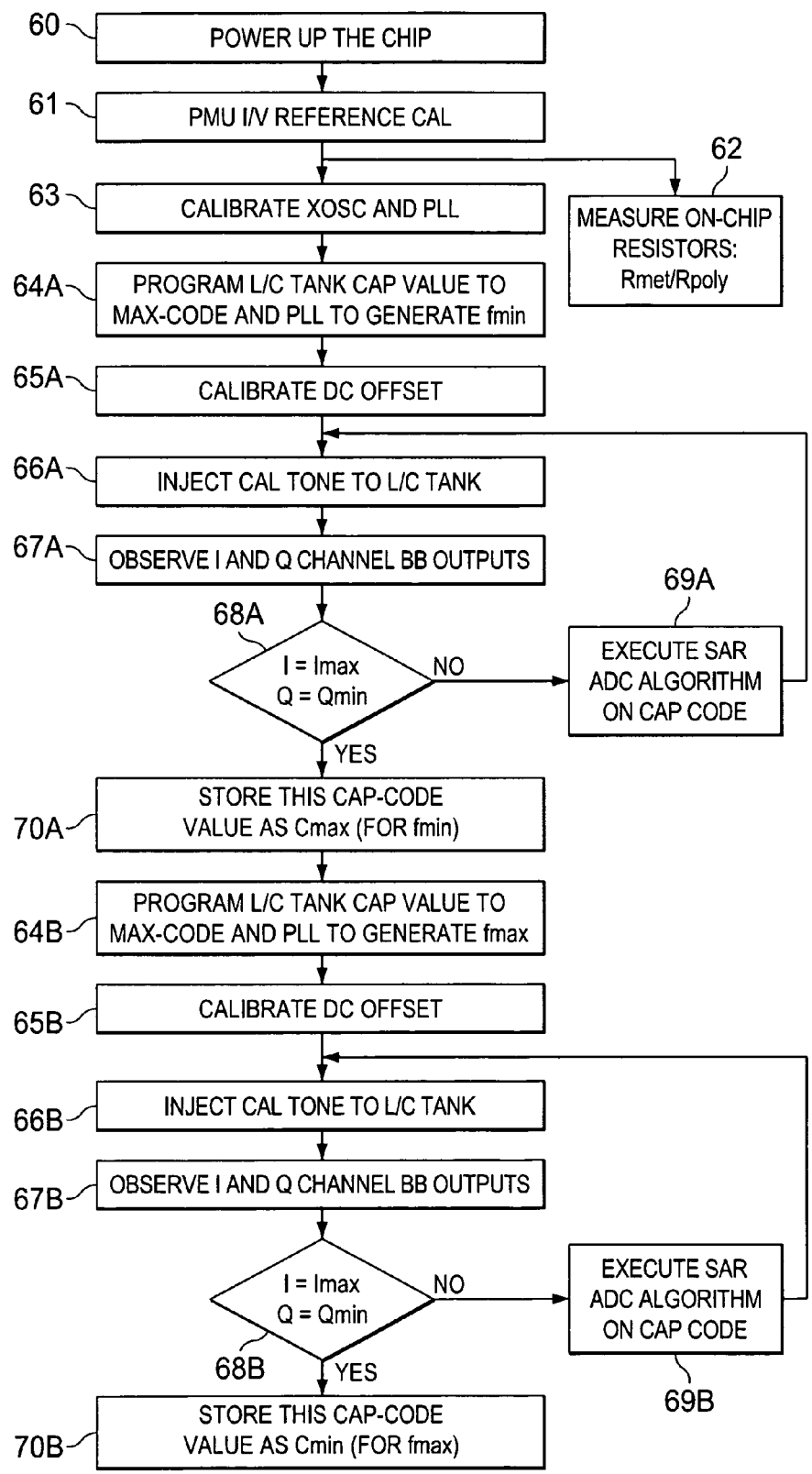
FIGS. 6A-C constitute flowcharts illustrating the various steps involved in self-calibration of the RF transceiver in FIG. 2.
Figure 6B:
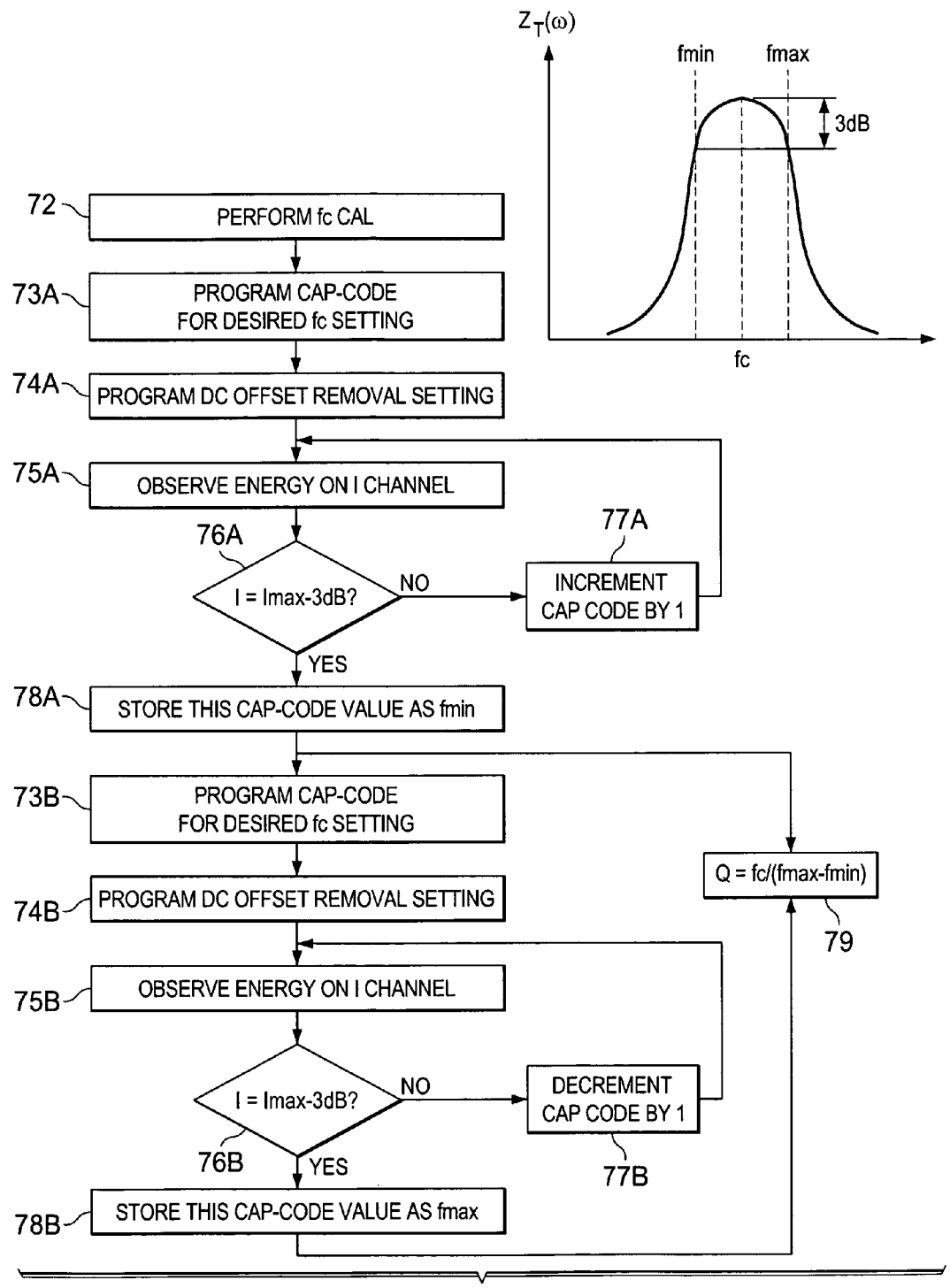
Figure 6C:
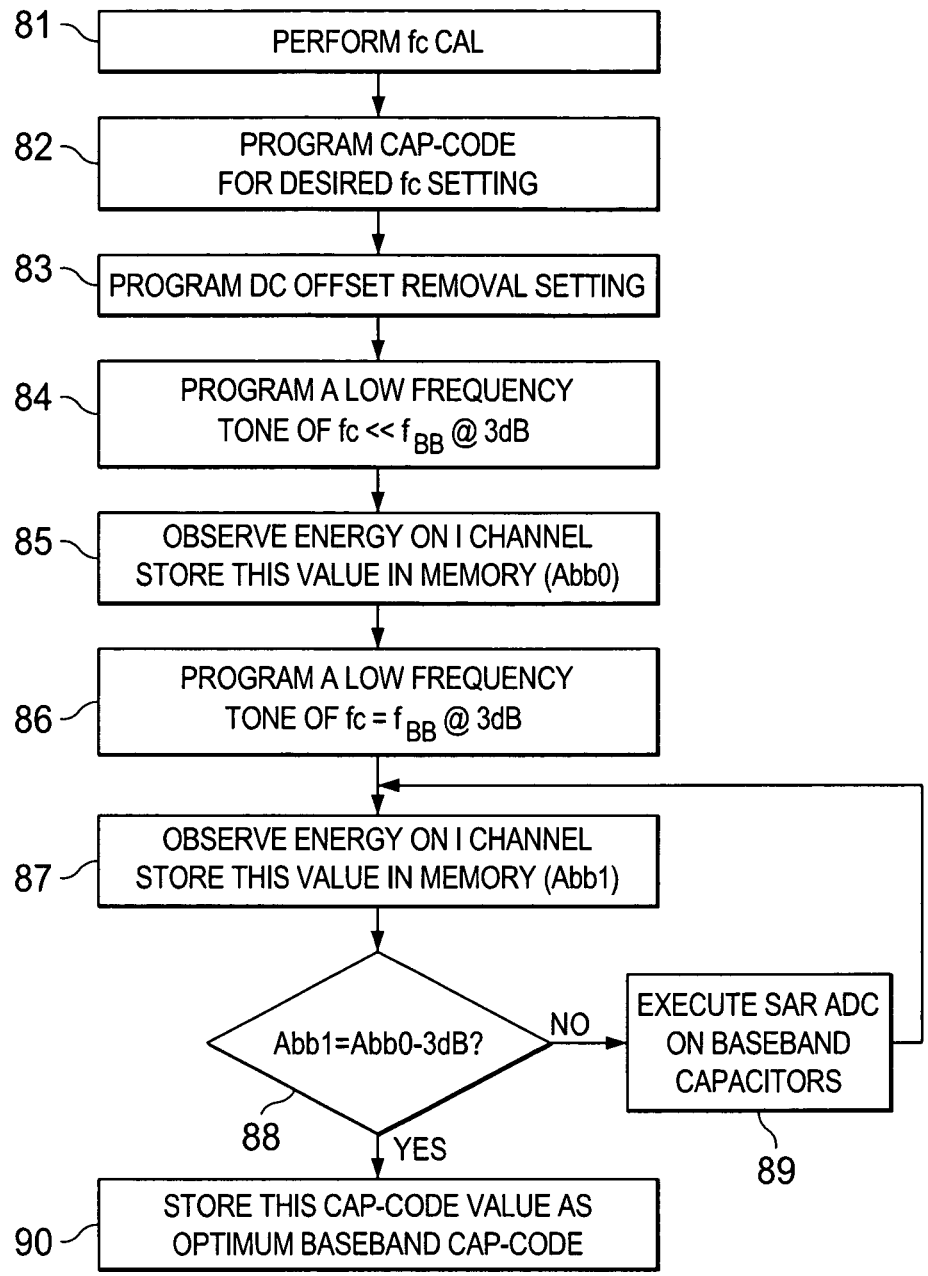

FIGS. 6A-6C together constitute a flowchart that indicates the steps involved in the operation of transceiver chip 101 of FIG. 2 in order to calibrate/adjust the center frequency fc of tank circuit 3A (FIGS. 3 and 4) using a single injected tone front the previously described tone generating circuitry. FIG. 6A shows the operating process for calibrating the center frequency fc of an on-chip tank circuit such as 3A. In block 60, transceiver chip 101 is powered up. In block 61, the current and voltage references generated by on-chip power management circuit 22 (FIG. 2) are calibrated relative to the precise current and voltage references of conventional integrated circuit manufacturing test systems. As indicated in block 62, this involves measuring resistances of on-chip metal traces such as the one utilized to provide the two inductors $L_p$ of tank circuit 3A. (It is important to know what the values of some of the resistors are, because the inductors are formed of metal and the DC value of the metal resistance is important to know in order to determine the initial Q factor of the resonator. That enables the self-calibration procedure to compensate in accordance with semiconductor manufacturing process variations, as subsequently explained, by indicating the process variation of the Q factor value of tank circuit 3A.)

The center frequency calibration algorithm then goes to block 63 and calibrates the crystal oscillator included in PLL circuitry based on precise crystal oscillator output crystal frequencies which are available for use in the self-calibration process. Next, in accordance with block 64A, the algorithm programs the L/C tank circuit 3A to the desired minimum frequency (obtained when the capacitor code in capacitor code register 27 is at maximum value corresponding to a center frequency according to the expression fc=1/sqrt(LpC). Transceiver 101 (FIG. 2) is designed to operate over a frequency range from $f_{MIN}$ to $f_{MAX}$, so the self calibration algorithm generates the lowest frequency $f_{LOW}$ to which of the transceiver needs to be tuned.

Then, in accordance with block 65A the algorithm calibrates the DC offset voltage of the entire RX (receiver) chain. The DC offset comes from static mismatch in the baseband analog signal processing blocks (i.e. amplifiers) as well as from finite reverse isolation between the LO (local oscillator) and RF frequencies in the mixer, which is the dynamic component. The DC offset of foe RX chain needs to be calibrated prior to performing the dynamic calibration of center frequency fc to avoid subsequent calculation errors as execution of the self calibration algorithm continues. In accordance with blocks 66A and 67A, a calibration tone is injected by tone generation/injection circuit 38 (FIG. 2) into nodes 7A and 7B. Then the algorithm monitors the signal magnitudes in the two channel baseband filter outputs (FIG. 4) and then, in accordance with block 68A, determines if the magnitude of in-phase signal I is at a maximum value and the magnitude of the quadrature-phase signal Q is at a minimum value. If the determination of decision block 68A is negative, the algorithm performs analog to digital conversion of the in-phase signal I as indicated in block 69A, increments the capacitor code in capacitor code register 27, and repeats the loop until decision block 68A determines that the magnitude of in-phase signal I is at a maximum value (and hence that the magnitude of the quadrature-phase signal Q is at a minimum value. Then the self calibration algorithm stores the present capacitor code value as a value Cmax which represents $f_{MIN}$, as indicated in block 70A.

In essentially the same manner, the steps indicated in blocks 64B-70B are repeated to obtain a capacitance value Cmin which represents a maximum frequency value $f_{MAX}$ and then store $f_{MAX}$ as indicated in block 70B. At this point sufficient information is known to compute quality factor Q, in accordance with the flowchart of FIG. 6B. When the transceiver needs to operate at any of the intermediate frequencies, the optimum capacitor code is obtained by interpolation.

Referring to FIG. 6B, block 72 indicates that the operating process of FIG. 6A for calibrating the quality Factor Q of an on-chip tank circuit such as 3A has been previously performed. As indicated in block 73A, the capacitor code in capacitor code register 27 (FIG. 2) is programmed for the desired center frequency value fc previously determined in accordance with FIG. 6A. As indicated in block 74A, the DC offset removal calibration result (see block 65A of FIG. 6A) has already been programmed into LNA 3 in accordance with the center frequency calibration process of FIG. 6A. In block 75A the algorithm determines the voltage of the present has already been determined in accordance with decision block 68A of FIG. 6A that the in-phase signal I is at a maximum value and the quadrature-phase signal Q is simultaneously at a minimum value. In decision block 76A of FIG. 6B, the algorithm determines if the amplitude of the in-phase signal I is 3 dB below its previously determined maximum value, and if that determination is negative, the self calibration algorithm goes to block 77A and increments the capacitor code by 1 and repeats the process of block 75A to again monitor the amplitude of in-phase signal I. This loop is repeated until the observed signal amplitude of the an phase signal I is 3 dB lower than its maximum amplitude. As indicated in the graph included in FIG. 6B, this provides the lower-side frequency $f_{MIN}$ on the impedance versus frequency curve. The lower 3 DB value $f_{MIN}$ then is stored, as indicated in block 78A.

Steps 73A through 78A are repeated as steps 73B through 78B to obtain and store the upper-side 3 dB frequency $f_{MAX}$. As indicated in block 79, the quality factor Q of tank circuit 3A is computed as $fc+((f_{MAX}-F_{MIN})$. This provides an indication of the tank circuit impedance and allows the self-calibration to optimize current consumption of the circuit.

The processes of FIGS. 6A and 6B can be repeated at different chip temperatures to observe the Q factor variations of tank circuit 3A over a range of temperatures. This is useful information to help power management circuit 22 (FIG. 2) to provide the required reference voltages/currents so as to cause transceiver chip 101 to have optimum dynamic range. Referring to the $Z_T(\omega)$ graph that is included on FIG. 6B, it shows the resonator impedance $Z_T(\omega)$ versus frequency. The maximum amplitude of $Z_T(\omega)$ occurs at the center frequency fc. The slopes of that curve can be more or less steep, depending on the Q factor of the tank circuit 3A.

FIG. 6C shows a flowchart indicating the procedure for calibrating the baseband filter bandwidth using dual tone injection. Steps 81, 82, and 83 in FIG. 6C will have already been performed as steps 72, 73A, and 74A of FIG. 6B. Then, as indicated in block 84, a low frequency tone having a frequency $f_{bb}$ the range $fc<<f_{3db}$, where $f_{3db}$ is the cut-off frequency of the baseband filter at which the in-phase signal I amplitude is expected to be 3 dB below its maximum value is injected. Then the voltage of the in-phase signal I is determined and stored as a value Abb0. Next, as indicated in block 86, a low frequency tone having a frequency $F_{bb}$ the range $fc=f_{bb}$ where $f_{bb}$ is the baseband frequency at which the in-phase signal amplitude is 3 dB from its maximum value is programmed. Then the voltage of the in-phase signal I is determined and stored as a value Abb1. Then decision block 88 determines if Abb1=Abb0−3 dB. If that determination is negative, then the algorithm performs an analog to digital conversion of the voltage of in-phase signal I and returns to block 87 and repeats the loop until an affirmative decision is reached. Then, as indicated in block 90, the algorithm then stores the corresponding capacitor code value as the optimum value corresponding to baseband value corresponding to the optimum value of $f_{bb}$.

Figure 7:
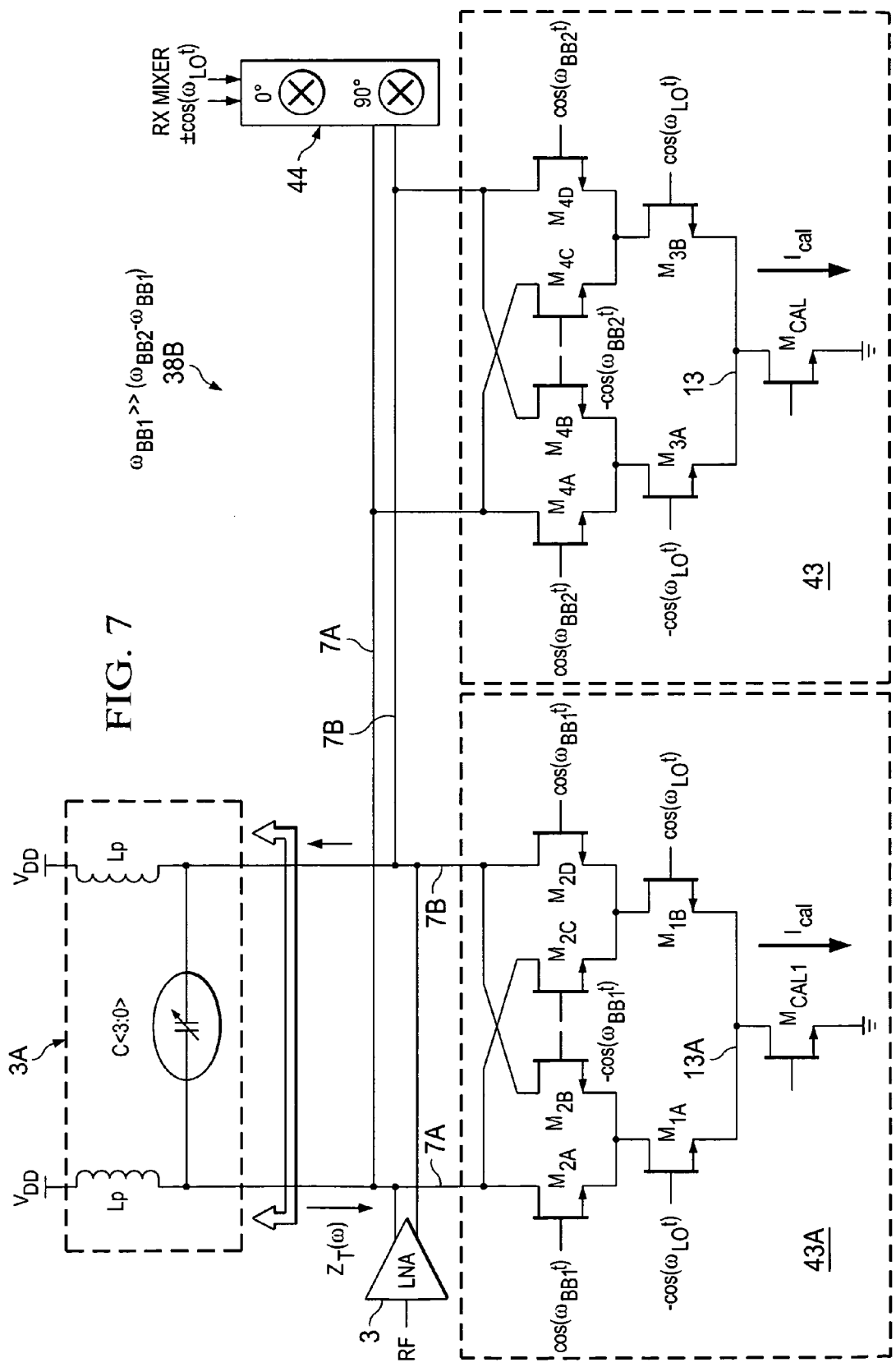
FIG. 7 is a schematic diagram that illustrates dual tone injection using double chopping for intermodulation calibration.

FIG. 7 is a schematic diagram of circuitry that performs dual tone injection using double chopping for intermodulation calibration applications. Tone injection circuit 38B in FIG. 7 is similar to tone injection circuit 38A in FIG. 4, and further includes tone injection circuitry 43A, Tone injection circuitry 43B includes transistor $M_{CAL1}$ and chopping transistors M1A, M1B, M2A, M2B, M2C, and M2D which operate from one phase of the PLL signal generated by PLL circuitry 33 (FIG. 2), so as to produce sinusoidal current waveforms for tones that are injected into the resonator interface nodes 7A and 7B. The gates of chopping transistors M2A and M2D receive a low-frequency local-oscillator-based baseband (BB) chopping signal $\cos(\omega_{BB1}t)$, and the gates of chopping transistors M2B and M2C receive the corresponding low-frequency chopping signal $-\cos(\omega_{BB1}t)$, where $\omega_{BB1}>>(\omega_{BB2}-\omega_{BB1})$. They also may be derived from the on-chip crystal oscillator by dividing its frequency down by some integer ratio. The drains of chopping transistors M2A and M2C are connected by interface conductor 7A to one terminal of tank circuit 3A and an input of RX mixer 44. The drains of chopping transistors M2B and M2D are connected by interface conductor 7B to the other terminal of tank circuit 3A and another input of RX auxiliary mixer 44. In tone generation circuit 43 of FIG. 7, the gates of chopping transistors M4A and M4D receive a low-frequency local-oscillator-based baseband (BB) chopping signal $\cos(\omega_{BB2}t)$, and the gates of chopping transistors M4B and M4C receive the corresponding low-frequency chopping signal $-\cos(\omega_{BB2}t)$. They also may be derived from the on-chip crystal oscillator by dividing its frequency down by some other integer ratio. This circuit injects two tones at high frequency to achieve self-calibration of intermodulation.

Figure 8:
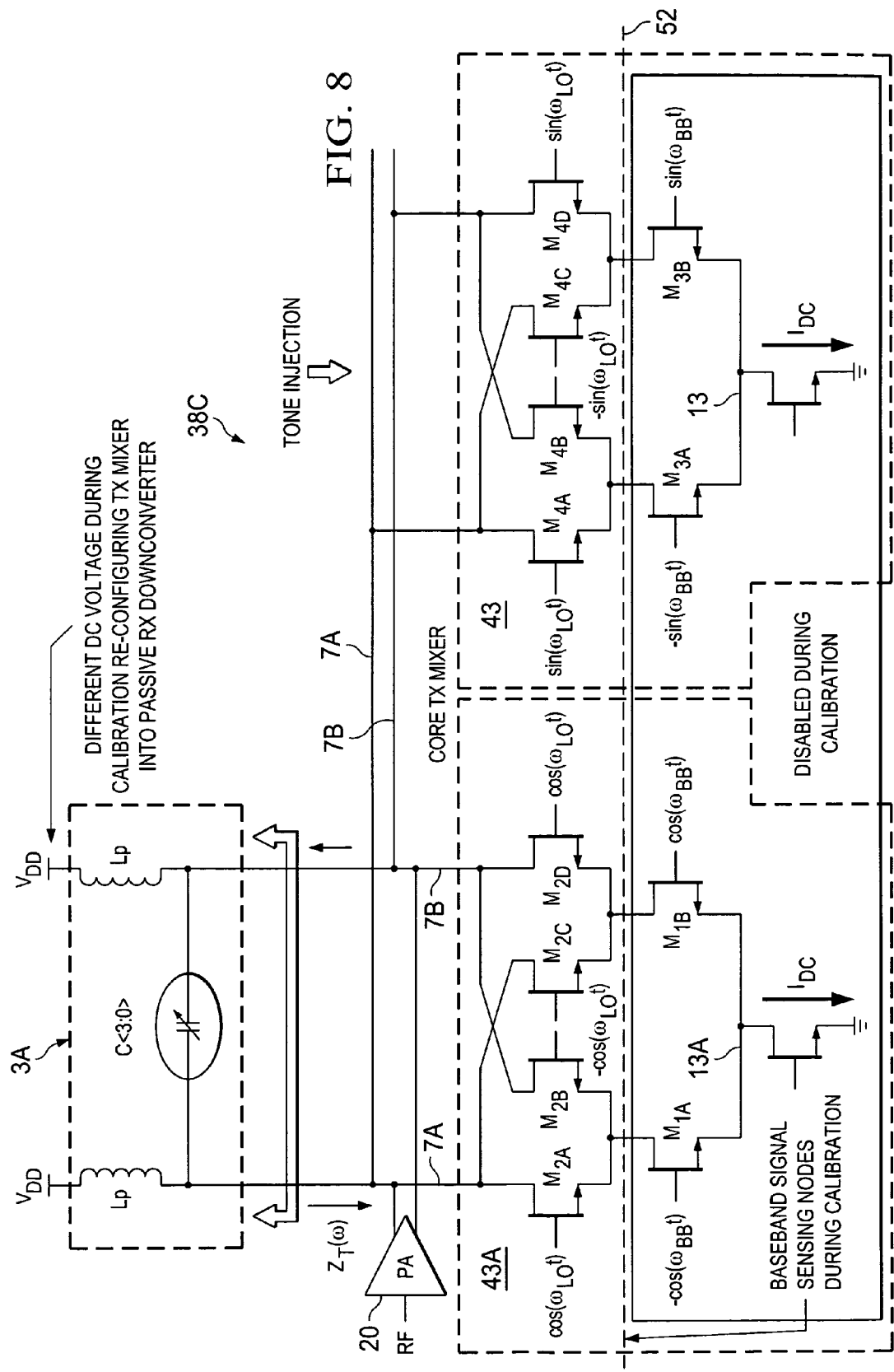
FIG. 8 is a schematic diagram that illustrates tone injection for transmitter tank circuit calibration.

FIG. 8 is a schematic diagram of circuitry that performs tone injection for transmitter tank circuit calibration. Tone injection circuit 38C in FIG. 8 is structurally similar to tone injection circuit 38B in FIG. 7, except that conductors 7A and 7B are connected to the input of power amplifier 20 (FIG. 2) instead of to the outputs of LNA 3. Chopping transistors M1A, M1B, M2A, M2B, M2C, and M2D in tone generation circuit 43A operate from one phase of a signal generated by PLL circuitry 33 (FIG. 2), so as to produce sinusoidal current waveforms for tones that are injected into the resonator interface nodes 7A and 7B. The gates of chopping transistors M2A and M2D receive a local-oscillator-based chopping signal $\cos(\omega_{LO}t)$, and the gates of chopping transistors M2B and M2C receive the corresponding low-frequency chopping signal $-\cos(\omega_{LO}t)$. In tone generation circuit 43 of FIG. 8, the gates of chopping transistors M4A and M4D receive a low-frequency local-oscillator-based baseband (BB) chopping signal $\cos(\omega_{BB}t)$, and the gates of chopping transistors M4B and M4C receive the corresponding low-frequency chopping signal $-\cos(\omega_{BB}t)$. They may be derived from the on-chip crystal oscillator by dividing its frequency down by some other integer ratio. This circuit injects two tones at high frequency to achieve self-calibration of resonant circuitry between the input of power amplifier 20 and resonant circuit 3A present at the TX (transmitter) mixer output. This is same as the LNA/mixer interface shown in FIG. 4, but with a physically separate resonator. The capacitor array has the same basic structure shown in FIG. 3.

Thus, FIG. 8 shows a core transmitter-mixer interface, and tone injection circuit 38C injects a tone at that interface. The values at the baseband terminal are represented by dashed line 52, which indicates the baseband signal during the self-calibration process in which a modulated tone is injected at transmitter-mixer interface and then the signal is sensed at the baseband, but instead of using a separate set of mixers, part of the core transmit mixer itself is used for this purpose.

Note that all of the above described tone injection and self calibration processes at the resonant interfaces should be performed one at a time, since the performances of the system is in effect a multiplication of the signals of each of the interface nodes in order to optimize the overall calibration of the system.

The various tone injection circuits described herein can perform various functions, including offset-mixing and tone injection at various high frequency interfaces to calibrate for L/C resonance and Q factor trimming. Some of the disclosed circuits can, at different times, both generate calibration tones to calibrate L/C resonance and R/C corner frequency. One disclosed tone injection circuit is coupled to a reconfigurable transmitter mixer so as to perform calibration off a transmitter mixer/power amplifier interface. Another disclosed tone injection circuit provides to tone generation capability to calibrate intermodulation of front-end amplifiers.

The described embodiment of the invention allows RF transceivers to be designed with resonant circuits having higher Q factors so as to reduce current/power consumption without reducing dynamic range. Minimum additional circuitry is required to achieve this, since much of the circuitry required its the self-calibration process is already included in modern RF transceivers. These advantages are limited mainly by aging of the crystal typically used to generate the various on-chip frequency reference signals used in the RF transceiver, and are relatively independent of aging and variation in integrated circuit process parameters over the transceiver lifetime because it can be readily and automatically recalibrated whenever needed.

Using an inexpensive chopper that can be flexibly placed in parallel with any resonance tank without significant loading facilitates generation of a variety of injection tones. After the LC resonance trimming has been performed, the Q factor of the resonator can be trimmed and maximized. The resonance frequencies can be trimmed for both the transmitter and receiver sections of the transceiver. The chopped current is precisely referenced with respect to the precise DC currents generated by power management unit 22 in FIG. 2 and the precise crystal-generated reference frequency. A particular chopper can be used in more than one place, for example, to generate the two tones for both the local oscillator and the baseband, basically to calibrate resonance at multiple independent resonance points, one tone being a high-frequency tone and one being a low frequency tone, or to generate the two tones for calibration applications intermodulation. In each case, this is accomplished using only a single PLL (phase locked loop) with its single VCO (voltage controlled oscillator).

The described self-calibrating integrated circuit chip can avoid the need for expensive test equipment that in the past has been used to generate high frequency tones (single tone, multiple tones, modulated tones) required to test comparable un-calibrated integrated circuit chips. The described self-calibrated high frequency transceiver chip has internal circuit nodes operating at high frequency which cannot be connected to a package pin because that would create significant loading on the in-phase I and quadrature-phase signal paths and which also may generate substantial undesirable signal crosstalk and may cause difficulty in design of an integrated circuit package for prior un-calibrated integrated circuit transceiver chips. Most of the characteristics of the described self-calibrating transceiver chip can be tested using a stable reference current and a crystal, both of which can be provided by a very low cost integrated circuit tester, and this can substantially reduce the cost of product testing during the manufacture of the self-calibrating transceiver chips. Production testing times of the self-calibrating transceiver chips are 10-100 times less than for transceiver chips using standard RF production test techniques.

The self-calibrating capability of the described transceiver chips can be utilized any time during their lifetimes (which may be critical for transceivers utilized in implanted medical devices, devices utilized in orbiting satellites, and in various other applications). The self-calibration capability may help to identify whether or not some of the various parameters are not within required specifications and may initiate re-configuration of some parameters in order to bring the self-calibrating transceiver within predetermined specifications. This may help provide maximum dynamic range per unit current consumption, and may lead to significant improvements in product manufacturing yield.

While the invention has been described with reference to several particular embodiments thereof, those skilled in the art will be able to make various modifications to the described embodiments of the invention without departing from its true spirit and scope. It is intended that all elements or steps which are insubstantially different from those recited in the claims but perform substantially the same functions, respectively, in substantially the same way to achieve the same result as what is claimed are within the scope of the invention. The described techniques are not specific to advanced CMOS technologies, and can be applied, for example, to circuits and systems using bipolar transistors.

What is claimed is:

1. Transceiver circuitry on an integrated circuit chip having reduced power consumption and high dynamic range, comprising:
    a first resonant circuit coupled to a narrowband interface between a first amplifier and an interfacing circuit, the first resonant circuit including a programmable first reactive element and a second reactive element which together determine a resonant frequency of the first resonant circuit;
    wherein the transceiver circuitry includes an in-phase signal channel and a quadrature-phase signal channel and amplitude sensing circuitry for sensing a maximum amplitude of one of an in-phase signal and a quadrature-phase signal; and
    an on-chip first tone generation circuit generating tones for injection into the in-phase signal channel and the quadrature-phase signal channel and operative in response to frequency scanning circuitry and also operative in response to the amplitude sensing circuitry to adjust the programmable first reactive element to calibrate the resonant frequency of the first resonant circuit from an undesired value to a desired resonant frequency by selectively coupling reactive sub-elements into operative relationship with the programmable first reactive element;
    wherein the second reactive element includes an inductor and the reactive sub-elements are an array of capacitors selectively coupled to form the programmable first reactive element;
    wherein the capacitors of the array are binary weighted;
    wherein the capacitive array includes a first group of switches for selectively coupling capacitors of the array, respectively, between first and second terminals of the first resonant circuit in response to control circuitry and the amplitude sensing circuitry;
    wherein the first amplifier is a low noise amplifier including input circuitry which includes a programmable first input transistor array including a first group of parallel-connected binary weighted transistors having control electrodes coupled, respectively, to the control circuitry for adjusting the conductance of the programmable first transistor array to improve matching between a second resonant circuit coupled between a control electrode of the programmable first transistor array and an RF signal source, and wherein the input circuitry also includes a programmable second input transistor array including a second group of parallel-connected binary weighted transistors having control electrodes, respectively, coupled to the control circuitry for adjusting the conductance of the programmable second transistor array to match the conductance of the programmable first input transistor array.

2. The transceiver circuitry of claim 1 wherein the control circuitry and the amplitude sensing circuitry cooperate to search for a binary input transistor selection code which causes selection of various switches of the first group so as to calibrate the resonant frequency of a second resonant circuit to equal the desired resonant frequency.

3. Transceiver circuitry on an integrated circuit chip having reduced power consumption and high dynamic range, comprising:
    a first resonant circuit coupled to a narrowband interface between a first amplifier and an interfacing circuit, the first resonant circuit including a programmable first reactive element and a second reactive element which together determine a resonant frequency of the first resonant circuit;
    wherein the transceiver circuitry includes an in-phase signal channel and a quadrature-phase signal channel and amplitude sensing circuitry for sensing a maximum amplitude of one of an in-phase signal and a quadrature-phase signal; and
    an on-chip first tone generation circuit generating tones for injection into the in-phase signal channel and the quadrature-phase signal channel and operative in response to frequency scanning circuitry and also operative in response to the amplitude sensing circuitry to adjust the programmable first reactive element to calibrate the resonant frequency of the first resonant circuit from an undesired value to a desired resonant frequency by selectively coupling reactive sub-elements into operative relationship with the programmable first reactive element;
    wherein the second reactive element includes an inductor and the reactive sub-elements are an array of capacitors selectively coupled to form the programmable first reactive element;
    wherein the capacitors of the array are binary weighted;

wherein the capacitive array includes a first group of switches for selectively coupling capacitors of the array, respectively, between first and second terminals of the first resonant circuit in response to control circuitry and the amplitude sensing circuitry;

including mixer circuitry for generating the in-phase signal and the quadrature-phase signal, the first tone generation circuit including double chopping circuitry including first chopping circuitry chopping a calibration current in response to a first chopping signal $\cos(\omega LOt)$ and also including second chopping circuitry chopping outputs of the first chopping circuitry in response to a second chopping signal $\cos(\omega BBt)$, wherein outputs of the second chopping circuitry are injected into an interface between a low noise amplifier and the mixer circuitry.

4. The transceiver circuitry of claim 3 wherein the double chopping circuitry includes a current source transistor coupled between a first reference voltage and sources of first and second chopper transistors, the double chopping circuitry also including a third chopper transistor having a source coupled to a drain of the first chopper transistor and a drain coupled to the first terminal of the first resonant circuit, a fourth chopper transistor having a source coupled to the drain of the first chopper transistor and a drain coupled to the second terminal of the first resonant circuit, a fifth chopper transistor having a source coupled to a drain of the second chopper transistor and a drain coupled to the first terminal of the first resonant circuit, and a sixth chopper transistor having a source coupled to the drain of the second chopper transistor and a drain coupled to the second terminal of the first resonant circuit, a first chopping signal $\cos(\omega LOt)$ being coupled to an input of the mixer circuit and a gate of the second chopper transistor, a second chopping signal $-\cos(\omega LOt)$ being coupled to another input of the mixer circuit and a gate of the second chopper transistor, a third chopping signal $\cos(\omega BBt)$ being coupled to gates of the third and sixth chopper transistors, and a fourth chopping signal $-\cos(\omega BBt)$ being coupled to gates of the fourth and fifth chopper transistors, where $\omega LO$ is the angular frequency of the first chopping signal $\cos(\omega LOt)$ and $\omega BB$ is the angular frequency of the third chopping signal $\cos(\omega BBt)$.

5. Transceiver circuitry on an integrated circuit chip having reduced power consumption and high dynamic range, comprising:

a first resonant circuit coupled to a narrowband interface between a first amplifier and an interfacing circuit, the first resonant circuit including a programmable first reactive element and a second reactive element which together determine a resonant frequency of the first resonant circuit;

wherein the transceiver circuitry includes an in-phase signal channel and a quadrature-phase signal channel and amplitude sensing circuitry for sensing a maximum amplitude of one of an in-phase signal and a quadrature-phase signal; and an on-chip first tone generation circuit generating tones for injection into the in-phase signal channel and the quadrature-phase signal channel and operative in response to frequency scanning circuitry and also operative in response to the amplitude sensing circuitry to adjust the programmable first reactive element to calibrate the resonant frequency of the first resonant circuit from an undesired value to a desired resonant frequency by selectively coupling reactive sub-elements into operative relationship with the programmable first reactive element;

wherein the second reactive element includes an inductor and the reactive sub-elements are an array of capacitors selectively coupled to form the programmable first reactive element;

wherein the capacitors of the array are binary weighted;

wherein the capacitive array includes a first group of switches for selectively coupling capacitors of the array, respectively, between first and second terminals of the first resonant circuit in response to control circuitry and the amplitude sensing circuitry;

including mixer circuitry for generating the in-phase signal and the quadrature-phase signal, the first tone generation circuit including first double chopping circuitry including first chopping circuitry chopping a first calibration current in response to a first chopping signal $\cos(\omega LOt)$ and also including second chopping circuitry chopping outputs of the first chopping circuitry in response to a second chopping signal $\cos(\omega BBt)$, wherein outputs of the second chopping circuitry are injected into an interface between a low noise amplifier and the mixer circuitry, the first tone generation circuit also including second double chopping circuitry including first chopping circuitry chopping a second calibration current in response to a first chopping signal $\cos(\omega LOt)$ and also including second chopping circuitry chopping outputs of the first chopping circuitry in response to a second chopping signal $\cos(\omega BBt)$, wherein outputs of the second chopping circuitry are injected into the interface between the low noise amplifier and the mixer circuitry, where $\omega BB$ is a baseband angular frequency and $\omega LO$ is a local oscillator angular frequency.

6. The transceiver circuitry of claim 5 wherein the first double chopping circuitry includes a first current source transistor coupled between a first reference voltage and sources of first and second chopper transistors, the first double chopping circuitry also including a third chopper transistor having a source coupled to a drain of the first chopper transistor and a drain coupled to the first terminal of the first resonant circuit, a fourth chopper transistor having a source coupled to the drain of the first chopper transistor and a drain coupled to the second terminal of the first resonant circuit, a fifth chopper transistor having a source coupled to a drain of the second chopper transistor and a drain coupled to the first terminal of the first resonant circuit, and a sixth chopper transistor having a source coupled to the drain of the second chopper transistor and a drain coupled to the second terminal of the first resonant circuit, the first chopping signal $\cos(\omega LOt)$ being coupled to an input of the mixer circuit and a gate of the second chopper transistor, a third chopping signal $-\cos(\omega LOt)$ being coupled to another input of the mixer circuit and a gate of the first chopper transistor, a fourth chopping signal $\cos(\omega BB2t)$ being coupled to gates of the third and sixth chopper transistors, and a fifth chopping signal $-\cos(\omega BB2t)$ being coupled to gates of the fourth and fifth chopper transistors, and wherein the second double chopping circuitry includes a second current source transistor coupled between the first reference voltage and sources of seventh and eighth chopper transistors, the second tone injector circuitry also including a ninth chopper transistor having a source coupled to a drain of the first chopper transistor and a drain coupled to the first terminal of the first resonant circuit, a tenth chopper transistor having a source coupled to the drain of the first chopper transistor and a drain coupled to the second terminal of the first resonant circuit, an eleventh chopper transistor having a source coupled to a drain of the second chopper transistor and a drain coupled to the first terminal of the first resonant circuit, and a twelfth chopper transistor having a source coupled to the drain of the second chopper transistor and a drain coupled to the second terminal of the first resonant circuit, the first chopping signal $\cos(\omega_{LO}t)$ being also coupled to a gate of the eighth chopper transistor, the second chopping signal $-\cos(\omega_{LO}t)$ being also coupled to a gate of the seventh chopper transistor, a sixth chopping signal $\cos(\omega_{BB1}t)$ being coupled to gates of the ninth and twelfth chopper transistors, and a seventh chopping signal $-\cos(\omega_{BB1}t)$ being coupled to gates of the tenth and eleventh chopper transistors, wherein $\omega_{BB1} \gg (\omega_{BB2} - \omega_{BB1})$, where $\omega_{LO}$ is the angular frequency of the first chopping signal $\cos(\omega_{LO}t)$, $\omega_{BB1}$ is the angular frequency of the sixth chopping signal $\cos(\omega_{BB1}t)$, and $\omega_{BB2}$ is the angular frequency of fourth chopping signal $\cos(\omega_{BB2}t)$.

7. The transceiver circuitry of claim 5 wherein the first tone generation circuit operates to calibrate intermodulation in the transceiver circuit.

8. Transceiver circuitry on an integrated circuit chip having reduced power consumption and high dynamic range, comprising:
   a first resonant circuit coupled to a narrowband interface between a first amplifier and an interfacing circuit, the first resonant circuit including a programmable first reactive element and a second reactive element which together determine a resonant frequency of the first resonant circuit;
   wherein the transceiver circuitry includes an in-phase signal channel and a quadrature-phase signal channel and amplitude sensing circuitry for sensing a maximum amplitude of one of an in-phase signal and a quadrature-phase signal; and
   an on-chip first tone generation circuit generating tones for injection into the in-phase signal channel and the quadrature-phase signal channel and operative in response to frequency scanning circuitry and also operative in response to the amplitude sensing circuitry to adjust the programmable first reactive element to calibrate the resonant frequency of the first resonant circuit from an undesired value to a desired resonant frequency by selectively coupling reactive sub-elements into operative relationship with the programmable first reactive element;
   wherein the second reactive element includes an inductor and the reactive sub-elements are an array of capacitors selectively coupled to form the programmable first reactive element;
   wherein the capacitors of the array are binary weighted;
   wherein the capacitive array includes a first group of switches for selectively coupling capacitors of the array, respectively, between first and second terminals of the first resonant circuit in response to control circuitry and the amplitude sensing circuitry;
   including a power amplifier having inputs coupled to the first and second terminals of the first resonant circuit and also including mixer circuitry for generating the in-phase signal and the quadrature-phase signal, the first tone generation circuit including first double chopping circuitry including first chopping circuitry chopping a calibration current in response to a first chopping signal $\sin(\omega_{BB}t)$ and also including second chopping circuitry chopping outputs of the first chopping circuitry in response to a second chopping signal $\sin(\omega_{LO}t)$, wherein outputs of the second chopping circuitry are injected into an interface between the power amplifier and the mixer circuitry,
   the first tone generation circuit also including second double chopping circuitry including first chopping circuitry chopping a second calibration current in response to a third chopping signal $\cos(\omega_{BB}t)$ and also including second chopping circuitry chopping outputs of the first chopping circuitry in response to a fourth chopping signal $\cos(\omega_{LO}t)$, wherein outputs of the second chopping circuitry are injected into the interface between the power amplifier and the mixer circuitry, where $\omega_{BB}$ is a baseband angular frequency and $\omega_{LO}$ is a local oscillator angular frequency.

9. The transceiver circuitry of claim 8 wherein the first double chopping includes a first current source transistor coupled between a first reference voltage and sources of first and second chopper transistors, the first double chopping circuitry also including a third chopper transistor having a source coupled to a drain of the first chopper transistor and a drain coupled to the first terminal of the first resonant circuit, a fourth chopper transistor having a source coupled to the drain of the first chopper transistor and a drain coupled to the second terminal of the first resonant circuit, a fifth chopper transistor having a source coupled to a drain of the second chopper transistor and a drain coupled to the first terminal of the first resonant circuit, and a sixth chopper transistor having a source coupled to the drain of the second chopper transistor and a drain coupled to the second terminal of the first resonant circuit, the fourth chopping signal $\cos(\omega_{LO}t)$ being coupled to an input of the mixer circuit, the first chopping signal $\sin(\omega_{BB}t)$ being applied to a gate of the second chopper transistor, a fifth chopping signal $-\cos(\omega_{LO}t)$ being coupled to another input of the mixer circuit, a sixth chopping signal $-\sin(\omega_{BB}t)$ being coupled to a gate of the first chopper transistor, the second chopping signal $\sin(\omega_{LO}t)$ being coupled to gates of the third and sixth chopper transistors, and a seventh chopping signal $-\sin(\omega_{LO}t)$ being coupled to gates of the fourth and fifth chopper transistors,
   and wherein the second double chopping circuitry includes a second current source transistor coupled between the first reference voltage and sources of seventh and eighth chopper transistors, the second tone injector circuitry also including a ninth chopper transistor having a source coupled to a drain of the first chopper transistor and a drain coupled to the first terminal of the first resonant circuit, a tenth chopper transistor having a source coupled to the drain of the first chopper transistor and a drain coupled to the second terminal of the first resonant circuit, a eleventh chopper transistor having a source coupled to a drain of the second chopper transistor and a drain coupled to the first terminal of the first resonant circuit, and a twelfth chopper transistor having a source coupled to the drain of the second chopper transistor and a drain coupled to the second terminal of the first resonant circuit, the third chopping signal $\cos(\omega_{BB}t)$ being also coupled to a gate of the eighth chopper transistor, an eighth chopping signal $-\cos(\omega_{BB}t)$ being also coupled to a gate of the seventh chopper transistor, the fourth chopping signal $\cos(\omega_{LO}t)$ being coupled to gates of the ninth and twelfth chopper transistors, and a ninth chopping signal $-\cos(\omega_{LO}t)$ being coupled to gates of the tenth and eleventh chopper transistors.

10. A method for reducing power consumption and improving dynamic range of integrated circuit transceiver circuitry which includes an in-phase signal and a quadrature-phase signal, the method comprising:

providing a first resonant circuit coupled to a narrowband interface between a first amplifier and an interfacing circuit, the first resonant circuit including a programmable first reactive element and a second reactive element which together determine a resonant frequency of the first resonant circuit;

injecting tones over a range of frequencies into the first resonator circuit and sensing maximum amplitudes of one of the in-phase signal and the quadrature-phase signal; and adjusting the capacitance of the programmable first reactive element in response to results of the amplitude sensing so as to shift the resonant frequency of the first resonant circuit from an erroneous value to a desired resonant frequency;

wherein the first amplifier is a low noise amplifier including input circuitry which includes a programmable input transistor array including a group of parallel-connected binary weighted transistors, the method including controlling transistors of the programmable input transistor array to adjust the conductance of the programmable transistor array to improve matching between a second resonant circuit coupled between a control electrode of the programmable transistor array and an RF signal source.

* * * * *